(12) United States Patent
Smirnov et al.

(10) Patent No.: US 11,762,113 B2
(45) Date of Patent: Sep. 19, 2023

(54) VELOCITY ESTIMATION OF SPATIAL ALIASED COHERENT NOISES PROPAGATING ALONG A PLURALITY OF SENSORS

(71) Applicant: SERCEL, Carquefou (FR)

(72) Inventors: Viktor Smirnov, Carquefou (FR); Julien Ribette, Carquefou (FR)

(73) Assignee: SERCEL, Carquefou (FR)

( * ) Notice: Subject to any disclaimer, the term of this patent is extended or adjusted under 35 U.S.C. 154(b) by 264 days.

(21) Appl. No.: 17/067,173

(22) Filed: Oct. 9, 2020

(65) Prior Publication Data

US 2022/0113438 A1   Apr. 14, 2022

(51) Int. Cl.
  *G01V 1/20*  (2006.01)
  *G01V 1/38*  (2006.01)

(52) U.S. Cl.
  CPC .............. *G01V 1/201* (2013.01); *G01V 1/38* (2013.01); *G01V 2001/204* (2013.01)

(58) Field of Classification Search
  CPC .... G01V 1/201; G01V 1/38; G01V 2001/204; G01V 2210/32; G01V 2210/44
  See application file for complete search history.

(56) References Cited

U.S. PATENT DOCUMENTS 10,371,840 B2   8/2019  Leboeuf 10,509,139 B2   12/2019  Ozdemir et al.
2007/0127312 A1*  6/2007  Storteig ............... G01C 13/006
                                                    367/15
2009/0092006 A1   4/2009  Teigen et al.

FOREIGN PATENT DOCUMENTS

CA    2748906 A1 *  7/2010  ............. G01V 1/201

OTHER PUBLICATIONS

Extended European Search Report in corresponding/related European Application No. 21306372.0 dated Mar. 4, 2022.
Øyvind Teigen et al. "Characterization of noise modes in multicomponent ( 4C) towed streamers," SEG Las Vegas 2012 Annual Meeting, 2012, pp. 1-5.

* cited by examiner

*Primary Examiner* — Ian J Lobo
(74) *Attorney, Agent, or Firm* — PATENT PORTFOLIO BUILDERS PLLC

(57) ABSTRACT

A method for calculating a velocity $vp(f, T_{opt})$ of a spatially aliased wave that propagates along a cable includes tensioning the cable, wherein plural sensors are distributed along the cable; measuring with the plural sensors a parameter that is associated with vibrations that propagate along the cable; calculating a phase velocity $vp(f)$ of the spatially aliased wave that propagates along the cable, as a function of a time frequency fin a spatial-temporal frequency domain FK; calculating a model-based velocity $vp(f, T)$ of the spatially aliased wave as a function of the time frequency f and a tension T in the cable; and calculating the velocity $vp(f, T_{opt})$ of the spatially aliased wave using a model-guided regression, which is based on the phase velocity $vp(f)$ and the model-based velocity $vp(f, T)$. The velocity $vp(f, T_{opt})$ is a function of the temporal frequency f.

20 Claims, 19 Drawing Sheets

VELOCITY ESTIMATION OF SPATIAL ALIASED COHERENT NOISES PROPAGATING ALONG A PLURALITY OF SENSORS

BACKGROUND

Technical Field

Embodiments of the subject matter disclosed herein generally relate to methods and systems for determining a speed of aliased spatial waves that propagate along plural sensors and, more particularly, to mechanisms and techniques for determining the speed of aliased spatial waves that propagate along a cable holding the plural sensors. The method and system also allow to determine a tension of the cable.

Discussion of the Background

Reflection seismology is a method of geophysical exploration to determine the properties of a portion of the earth's subsurface, information that is especially helpful for determining the location of underground deposits (e.g., oil, gas, etc.). Marine reflection seismology is based on the use of a controlled source that sends energy waves into the earth. By measuring the time it takes for the reflections to come back to plural receivers, it is possible to estimate the depth and/or composition of the features causing such reflections. These features may be associated with the underground deposits.

For marine applications, a conventional seismic survey system 100, as illustrated in FIG. 1, includes a vessel 102 that tows plural streamers 110 (only one is shown in the figure for simplicity) and a seismic source 130. The streamer 110 is attached through a lead-in cable (or other cables) 112 to the vessel 102, while the source array 130 is attached through an umbilical 132 to the vessel. A head float 114, which floats at the water surface 104, is connected through a cable 116 to a head end 110A of the streamer 110, while a tail buoy 118 is connected, through a similar cable 116, to a tail end 1106 of the streamer 110. Head float 114 and tail buoy 118 are used, among other things, to maintain the streamer's depth. Seismic receivers 122 are distributed along the streamer and are configured to record seismic data. Seismic receivers 122 may include a hydrophone, geophone, accelerometer, gradient pressure receiver or a combination thereof. Positioning devices (birds) 128 are attached along the streamer and controlled by a controller 126 for adjusting a position of the streamer according to a survey plan.

The source array 130 has plural source elements 136, which typically are air guns. The source elements are attached to a float 137 to travel at desired depths below the water surface 104. During operation, the vessel 102 follows a predetermined path T while the source elements 136 emit seismic waves 140. These waves bounce off the ocean bottom 124 and other layer interfaces below the ocean bottom 124 and propagate as reflected/refracted waves 144 that are recorded by the receivers 122. The positions of both the source elements 136 and the recording receivers 122 are estimated based on GPS systems 124 and recorded together with the seismic data in a storage device 127 onboard the vessel. Controller 126 is connected to the vessel's navigation system and other elements of the seismic survey system, e.g., birds 128 and may also be used to achieve quality control.

During the seismic acquisition process, tensile loads are generated on the towed seismic streamers due to the boat's traction and drag forces. The various devices attached to the streamers, e.g., birds for controlling the position of the streamer, make the streamer to vibrate, which results in waves that are transmitted to the head and the tail of the streamer. These waves are referred herein to upward and downward transverse waves. The velocity of these waves was shown in U.S. Pat. No. 10,371,840 (the "'840 patent" herein, the entire content of which is incorporated in this application by reference), to depend on both the local tension of the streamer and the frequency of the wave. These upward and downward transverse waves act as coherent noise, which degrades the quality of the acquired seismic data.

Thus, understanding of these waves may offer the chance to suppress this coherent noise, which would constitute a significant improvement in the bandwidth of the recorded seismic signals. While the '840 patent uses the correlation between the signals measured by adjacent sensors, located along the streamer, for determining the speed of these coherent noise, this approach does not take into account the dispersive nature of these waves and the velocity thus obtained is associated with the most energetic frequency component. A bandwidth approach, or similarly by working on the spectrum, cannot be considered because of the low signal-to-noise ratio in some bands. Some authors suggested adding a known source of vibration, which seems very costly and restrictive from an operational point of view.

Thus, there is a need to provide a new method for evaluating the velocity of the transverse waves that propagate along the streamers as a function of the frequency of the waves. More generally, this need is encountered for any cable under tension. The optimization of the tension thereby applied to the cable would also be beneficial.

SUMMARY

According to an embodiment, there is a method for calculating a velocity $vp(f, T_{opt})$ of a spatially aliased wave that propagates along a cable. The method includes tensioning the cable, wherein plural sensors are distributed along the cable, measuring with the plural sensors a parameter that is associated with vibrations that propagate along the cable, calculating a phase velocity $vp(f)$ of the spatially aliased wave that propagates along the cable, as a function of a time frequency fin a spatial-temporal frequency domain FK, calculating a model-based velocity $vp(f, T)$ of the spatially aliased wave as a function of the time frequency f and a tension T in the cable, and calculating the velocity $vp(f, T_{opt})$ of the spatially aliased wave using a model-guided regression, which is based on the phase velocity $vp(f)$ and the model-based velocity $vp(f, T)$. The velocity $vp(f, T_{opt})$ is a function of the temporal frequency f. In one application, the velocity is used to suppress a noise that is present in the cable.

According to another embodiment, there is a computing device for calculating a velocity $vp(f, T_{opt})$ of a spatially aliased wave that propagates along plural sensors. The computing device includes an interface configured to receive data Dt, wherein the data Dt is associated with a parameter measured by the plural sensors distributed along a cable, and the parameter is indicative of vibrations that propagate along the cable, and a processor connected to the interface. The processor is configured to calculate a phase velocity $vp(f)$ of the spatially aliased wave that propagates along the cable, as a function of a time frequency fin a spatial-temporal frequency domain FK, calculate a model-based velocity $vp(f, T)$ of the spatially aliased wave as a function of the time frequency f and a tension T in the cable, and calculate the velocity vp(f, $T_{opt}$) of the spatially aliased wave using a model-guided regression, which is based on the phase velocity vp(f) and the model-based velocity vp(f, T). The velocity vp(f, $T_{opt}$) is a function of the temporal frequency f.

According to still another embodiment, there is a method for estimating the tension $T_{opt}$ of a tensed cable comprising plural sensors distributed along. The method includes estimating a first tension of the cable, measuring in the time-space domain with the plural sensors a parameter that is associated with vibrations that propagate along the cable, wherein the parameter may be an acceleration, velocity, displacement, or pressure, transforming the data Dt associated with the parameter from the time-space domain to the FK domain to obtain FK data F(f, k), wherein f is the temporal frequency and k is the spatial frequency, periodizing the data F(f, k) according to the spatial frequency k, wherein a factor C is used to replicate the data F(f, k) to obtain the periodized data Fp(f, k), defining a mask M(f, k) in the FK domain to isolate an upward or downward wave and applying the mask M(f, k) to the periodized data Fp(f, k) to obtain the masked data Wm(f, k), generating a first list L1, for each of the spatial frequency k, that includes (1) a frequency fmax that maximizes the masked data |Wm(f, k)|, and (2) a first speed fmax/k, generating a second list L2, for each the temporal frequency f, that includes (i) a spatial frequency kmax that maximizes the masked data |Wm(f, k)|, and (2) a second speed f/kmax, optionally generating a third list L3, that includes pairs common to the first list L1 and the second list L2, for each of the generated lists, calculating a phase velocity vp(f) of the spatially aliased wave that propagates along the cable, selecting a tension Tj, and calculating a model-based velocity vp(f, Tj) for the tension Tj, calculating a root mean square error (RMSE) between (a) the model-based velocity vp(f, Tj) for the tension Tj, and (b) the velocity associated with each of the lists, and selecting the optimized tension $T_{opt}$ associated with the minimum RMSE.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
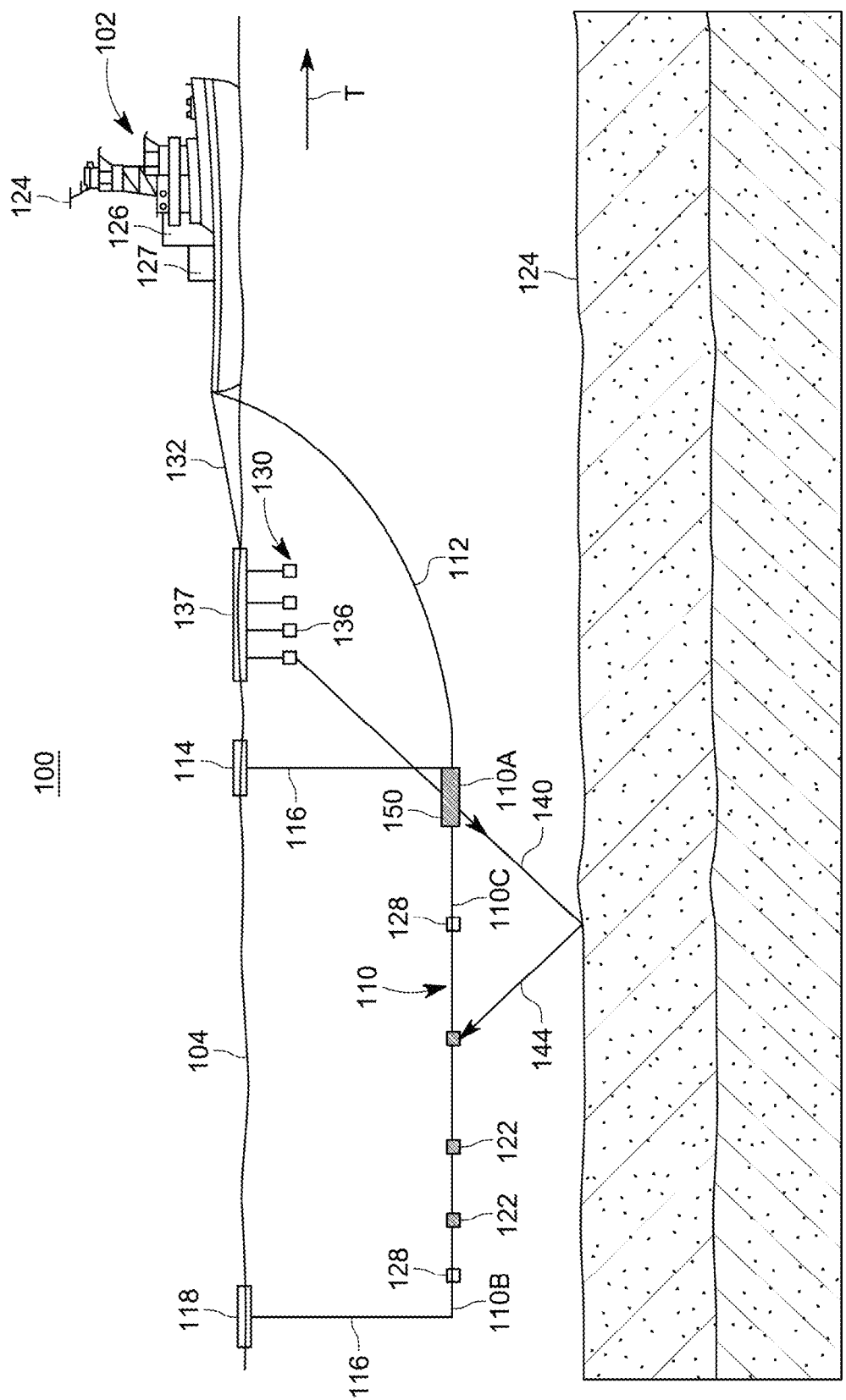
FIG. 1 is a schematic diagram of a marine seismic acquisition system.

The following description of the embodiments refers to the accompanying drawings. The same reference numbers (except the first digit) in different drawings identify the same or similar elements. The following detailed description does not limit the invention. Instead, the scope of the invention is defined by the appended claims. The following embodiments are discussed, for simplicity, with regard to the terminology and structure of a streamer towed in water by a vessel. However, the embodiments to be discussed next are not limited to a marine streamer; they may be applied to other elements with vibration sensors that are towed in water, for example, an antenna or any cable that hosts motion sensors, or that are otherwise under tension, like downhole seismic cables. In general the embodiments are to be adapted to any sensor cable along which a spatially aliased wave is propagating.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a cable or streamer (or antenna) that includes seismic sensors capable of measuring a quantity (e.g., speed, displacement, acceleration or pressure) indicative of a motion sensor. If the cable is a streamer that is towed in water, the seismic sensor measures the above quantity, which is indicative of the water motion. If the cable is a well cable, which is distributed in an oil and gas environment, for example, an exploration well, seismic sensors or other vibration sensors may be used for measuring the quantity. For this case, the tension in the cable is generated by the weight of the cable and/or the sensors and other devices attached to the cable in the vertical part of the well. Those skilled in the art would understand that the embodiments discussed herein can be applied to any cable that holds plural sensors that are able to detect a vibration of the cable, either directly or indirectly. However, for simplicity, herein only a streamer, i.e., a cable with seismic sensors, is discussed. Such a seismic sensor may be an accelerometer or hydrophone. Any single sensor or array of sensors that measure the above noted quantity are called herein a motion sensor. The motion sensors are distributed along the streamer. Based on information recorded by the motion sensors, the tensile load in the streamer, at each location of the streamer may be calculated. A model that relates the tension in the streamer to the speed of a transverse wave (noise) that propagates along the streamer is introduced. On one hand, the velocity of the transverse wave is calculated based on this model, and thus, this velocity is called herein the model-based velocity $vp(f, T)$, which depends on the temporal frequency f and the tension T in the streamer. On the other hand, the velocity of the transverse wave is also calculated by (1) transforming the recorded traces into another domain, for example, the spatial-temporal frequency (FK) domain, (2) periodizing the FK data, (3) unwrapping the spatial aliases waves in the FK domain, (4) selecting a mask that hides all spatial frequency indices $n_k$ and temporal frequency indices of except for a given $n_{k0}$ and $n_{f0}$, (5) calculating the velocity of the transverse wave in the FK domain, after the mask was applied, which is called herein the phase velocity $vp(f)$, and (6) applying a regression between (i) the velocity of the transverse wave calculated based on the tension in the streamer, i.e., the model-based velocity $vp(f, T)$ and (ii) the velocity of the transverse wave calculated in the FK domain, i.e., the phase velocity $vp(f)$, to determine the final velocity of the transverse wave as a function of the frequency f of the wave.

This method can be applied in the context of aliased spatial waves. This is the case of the transverse waves propagating along a marine seismic streamer. More generally, the method discussed herein can be used for all types of waves propagating along plural sensors distributed along a cable. While this method is discussed herein in the context of a streamer (an antenna that is towed in water), and more particularly, with regard to the transverse vibration waves measured by the accelerometers distributed along the streamer, the method could also be applied to hydrophone sensors that measure this vibration wave (the vibration results in a difference in altitude that is measured by the hydrophones via the hydrostatic pressure variation), or to other vibration sensors being part of a cable which is under tension. The method can also be applied to other waves recorded by the streamer sensors, such as rotational waves.

The techniques proposed in the art use a correlation between the signals measured by adjacent sensors located along the streamer. The main limitation of these techniques is that they do not take into account the dispersive nature of the waves and the velocity thus obtained is associated only with the most energetic frequency component. A bandwidth approach, or similarly, by working on the spectrum, cannot be considered because of the low signal-to-noise ratio in some bands. Some authors suggested adding a known source of vibration, which seems very costly and restrictive from an operational point of view.

The method proposed in this application allows to overcome these limitations and estimate the velocity of the transverse wave as a function of the frequency. Using the most energetic frequency components, it will be shown that it is possible, from a model, to infer the wave velocity over a much wider band despite the low signal-to-noise ratio. The method allows, from a set of traces, to obtain an increased stability compared to the traditional correlation methods.

The method to be discussed herein also has the advantage of being able to characterize separately the velocity of the upward and downward waves, and to provide an indicator on the dominant waves on the traces involved. The method may also provide an estimation of the cable tension which is optimized.

Figure 2:
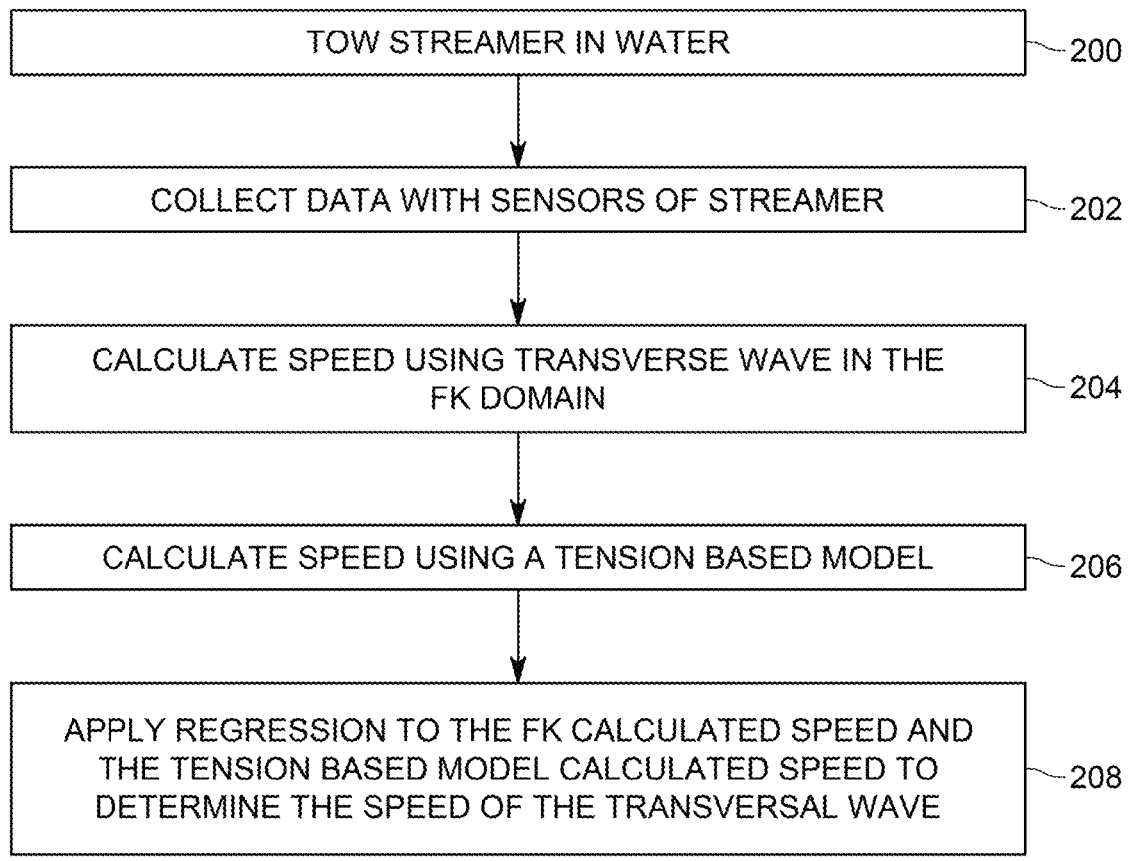
FIG. 2 is a flow chart of a method for calculating a velocity of a transversal wave, which propagates along a streamer, as a function of the frequency of the wave and of its position on the streamer.

The above method is now discussed in more detail with regard to FIG. 2. The method starts in step 200 by towing the streamer in water—it is clear that for other applications, the towing of the sensors cable could be replaced by other traction method, like the effect of gravity for downhole seismic tool as in U.S. Pat. No. 9,556,694. The streamer is towed at a given depth relative to the water's surface. Note that the streamer includes M motion sensors, where M is an integer in the range of hundred or thousand. Those skilled in the art would understand that M can also be in the tens. In step 202, the M motion sensors record vibrations that propagate along the streamer. In one embodiment, it is possible to have the seismic source silent, so that no seismic data is recorded by the M sensors, but only the vibrations that propagate along the streamer due to the motion of the streamer in the water. In one embodiment, the seismic source is active and both the seismic data and the vibrations that propagate along the streamer due to the motion in the water are simultaneously recorded. In step 204, the method transforms the collected data, which is in the time-space domain, into the FK domain, to determine the speed of the transverse wave. Then, in step 206, the method uses a tension versus speed model to also determine the speed of the transverse wave. After both speeds are determined, a regression method is applied in step 208 to determine the actual speed of the transverse wave. Each of these steps is now discussed in more detail.

Figure 3:
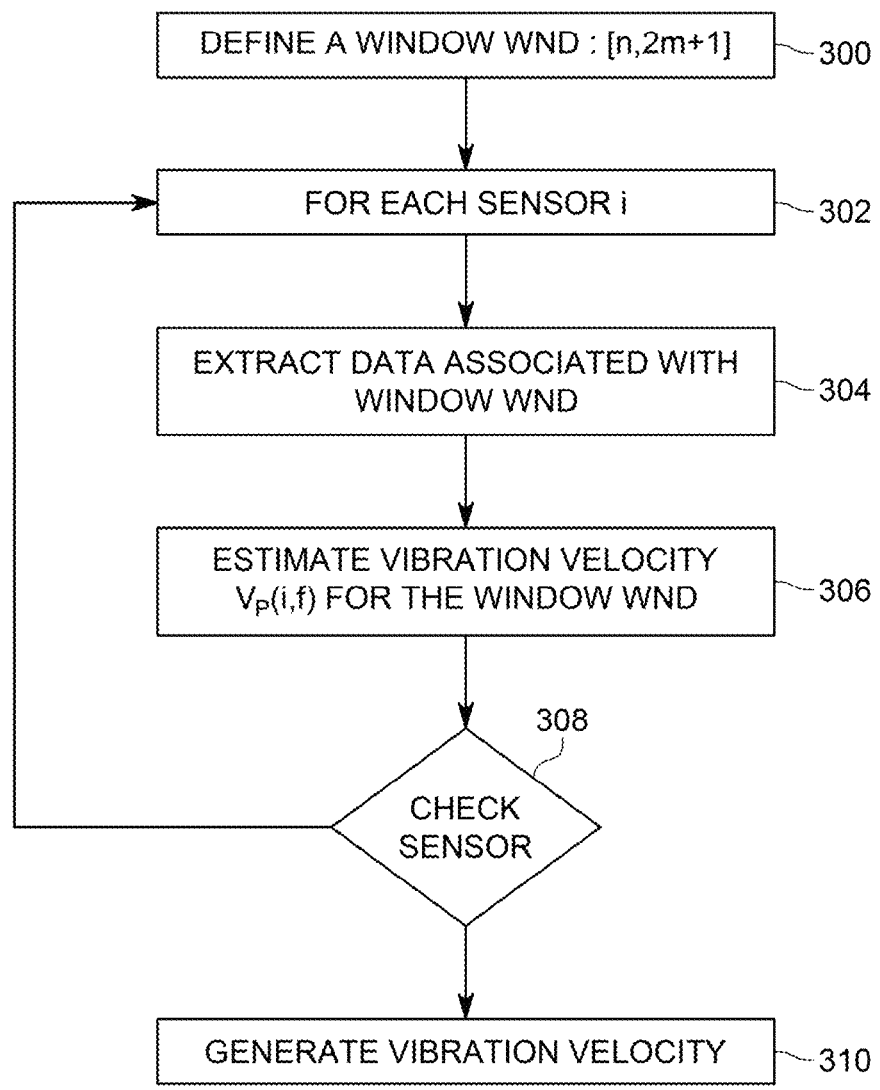
FIG. 3 is a flow chart that illustrates how to separate the data and obtain a sub-set on which a constant tension can be considered for calculating a velocity of a transversal wave that propagates along a streamer.

FIG. 3 illustrates how the data acquired in step 202 is segmented before applying step 204, and includes a step 300 of defining a window WND having the size [n, 2m+1], where n is a time dimension corresponding to a temporal sample, and m is a spatial dimension, corresponding to a number of sensors on the streamers. In one application, the selected window is rectangular, having n between 5 seconds and 2 minutes and m between 5 and 15 sensors. Those skilled in the art would understand that other numbers may be used. Note that 2m+1 is an integer smaller or equal to M, which represents the total number of sensors on the streamer. The window WND is a 2D window, and can be selected to be any of the windows known in the art, for example, Hamming, or Blackman, etc. The window allows to select the sensors for the calculation of the vibration velocity. The velocity model given by the '840 patent shows that the velocity depends on the streamer tension T and therefore, to obtain a proper estimate, it is desirable to use a limited number of sensors with a locally constant tension.

In one application, to estimate the velocity dispersion within the window, it is possible to calculate the tension T's variation slope s1 on the streamer (in N/m) using, for example, the model of the '840 patent. Thus, in the selected window, the tension T's variation range $\Delta T$ (in N), is given by: $\Delta T = 2 \cdot m \cdot D \cdot s1$, with D being the distance between two adjacent sensors (in meters) along the streamer. As the streamer is a towed cable, its tension decreases linearly along the cable (more tension at the head than at the tail) and the tension T is given by: $T(x) = s1 \cdot x + T_0$, where x is a location along the streamer and $T_0$ is the tension in the cable when x=0.

The selected window WND contains 2m+1 traces and the tension range along the streamer, for the selected window, between the first and the last trace, is given by $\Delta T = 2 \cdot m \cdot D \cdot s1$.

Using the model given by the '840 patent, it is possible to show that the non-dispersive part of the wave has a velocity variation slope s2 (per Newton) given by $$s2 = \frac{\Delta v_p}{\Delta T} = \frac{1}{d \cdot \sqrt{T \cdot \pi \cdot \rho_a}},$$

with d being the diameter of the streamer and $\rho_a$ the effective density of the streamer. Note that the velocity variation slope s2 may be obtained from the model of the '840 patent, which shows (for the low frequencies approximation) that the phase velocity is given by $$vp = \frac{2}{d}\sqrt{\frac{T}{\pi \cdot \rho_a}},$$

which does not depend on the frequency and therefore, corresponds to a non-dispersive model. Deriving lip from the tension T gives the velocity variation slope s2.

Thus, the velocity dispersion range in the window WND is given by $\Delta v_p = \Delta T \cdot s2$ and depends on both the spatial length of the window (2m+1) and the tension T of the streamer in the central position of the window. In one application, it is possible to use windows of variable spatial sizes to respect a defined precision on the vibration velocity.

The temporal dimension of the window WND controls the time frequency resolution of the velocity to be calculated. However, the window WND should not be a too large window because over long periods of time, the velocity of the waves can change with the evolution of different parameters (flow direction, vessel speed, vessel heading, etc.).

The method then advances to step 302, where each sensor of the M sensors of the streamer are considered. For a given sensor "i", the method uses in step 304, the window WND selected in step 300, to extract the data Dt measured by the sensors i−m to i+m, for estimating the vibration velocity. Note that for the beginning and ending traces of the streamer, the window WND cannot be used and thus, this window needs to be adapted. For example, it is possible to consider for the beginning traces the sensors i to i+2m and for the end traces, the sensors i−2m to i. Based on this data, the method estimates in step 306 the vibration velocity $v_p(i, f)$, which is discussed in more detail with regard to FIG. 4. In step 308 the method tests whether all the sensors have been processed and in step 310, the final vibration velocity $v_p(i, f)$ is generated and can be used for various processing methods.

Figure 4:
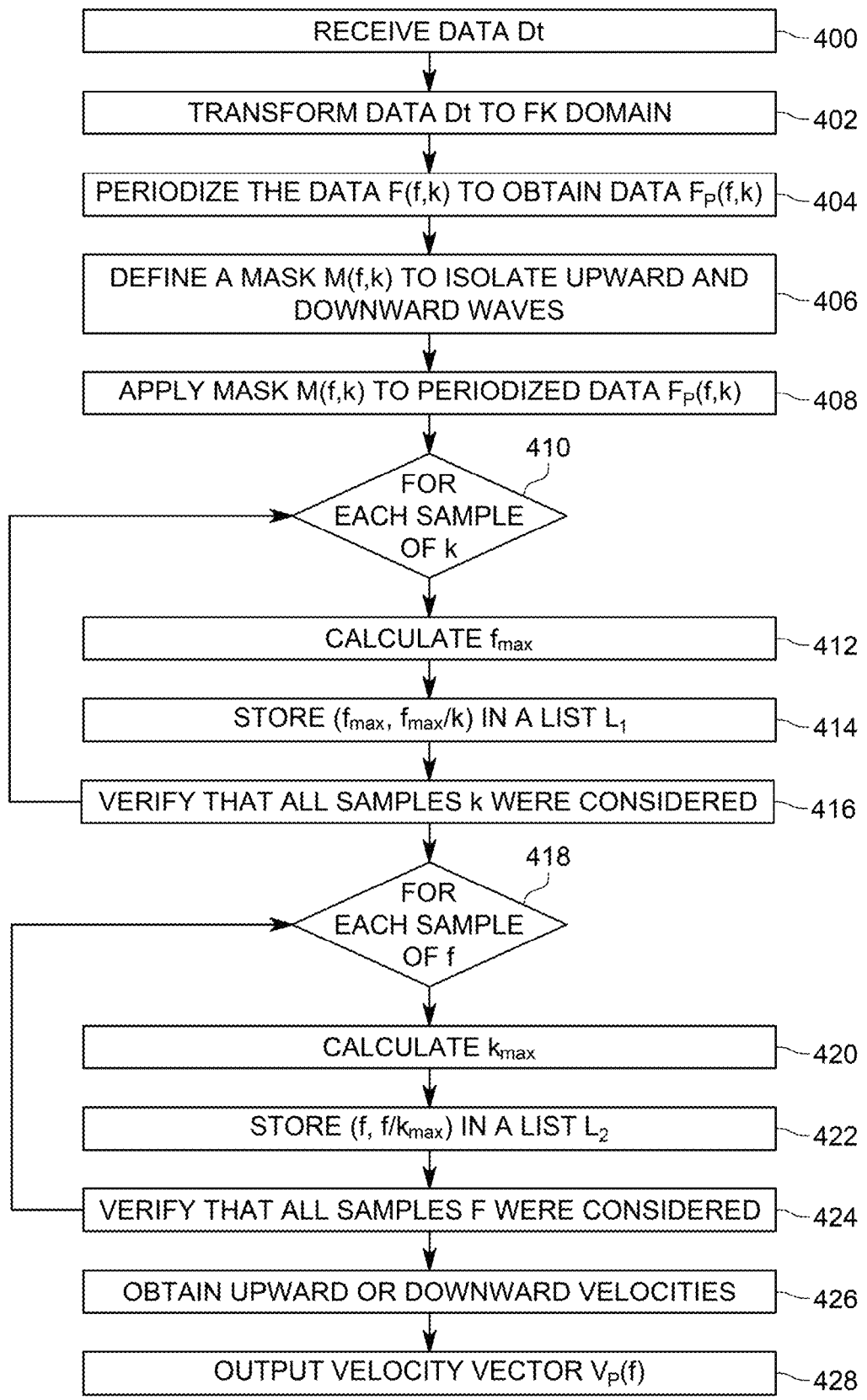
FIG. 4 is a flow chart for calculating a velocity of a transversal wave that propagates along a streamer, by using a spatial-temporal frequency (FK) domain.

The steps for calculating the vibration velocity $v_p(i, f)$ are now discussed with regard to FIG. 4. The method receives in step 400 the data Dt collected in step 304, for the selected window WND, and the data Dt has a size [n, 2m+1]. The data Dt is then transformed in step 402, from the time-space domain t-x, to the FK domain, by using a double Fourier transform in time t and distance x. The FK domain allows signals to be filtered according to their propagation speed, especially if the waves propagate with a constant speed v, as is the case for the transverse waves propagating along the streamer at a frequency below 15 Hz. Such signals are represented in the (k, f) plane as a straight line described by the equation f=−kv. The FK transform is also invertible, which makes it possible to consider mask filtering (as discussed later) directly on this domain for selecting the waves propagating with a given speed. The 2D Fourier transform of a sampled 2D signal y(t, x) in the space-time domain, of size N×M, where t denotes the time samples and x denotes the space samples, is defined by:

$$Y(f, k) = \sum_{m=0}^{M-1}\sum_{n=0}^{N-1} y(t, x) e^{-i2\pi\left(f\frac{n}{N} + k\frac{m}{M}\right)},$$

where f denotes the temporal frequency samples and k denotes the spatial frequency samples.

Similar to the one-dimensional Fourier transform, the 2D transform is also subject to aliasing. This means that the maximum frequency of a signal must be less or equal to the sampling frequency divided by 2, or otherwise there is aliasing. Thus, the following inequality for the maximum spatial frequency without aliasing is obtained:

$$k_{max} = \frac{k_{ech}}{2} = \frac{1}{2 \cdot D}$$

with D being the distance between two adjacent sensors.

The temporal frequency $f_{max}$ for which the aliasing occurs is given by:

$$k_{max} = \frac{f_{max}}{vp(T, f_{max})} = \frac{1}{2 \cdot D}$$

The specific data that was used by the inventors has inter-traces of 12.5 m, i.e., a sampling frequency of 0.08 m$^{-1}$. Thus, for a wave frequency f propagating at a velocity v(f), the following relationship need to be verified to avoid spectral aliasing:

$$k = \frac{f}{v(f)} \leq 0.04 \text{ m}^{-1}.$$

If the approximation proposed by the '840 patent for the low frequency is used, the following relation is obtained for the temporal frequency:

$$f_{max} = \frac{vp(T)}{2D} = \frac{1}{d \cdot D}\sqrt{\frac{T}{\pi \rho_a}}.$$

Figure 5:
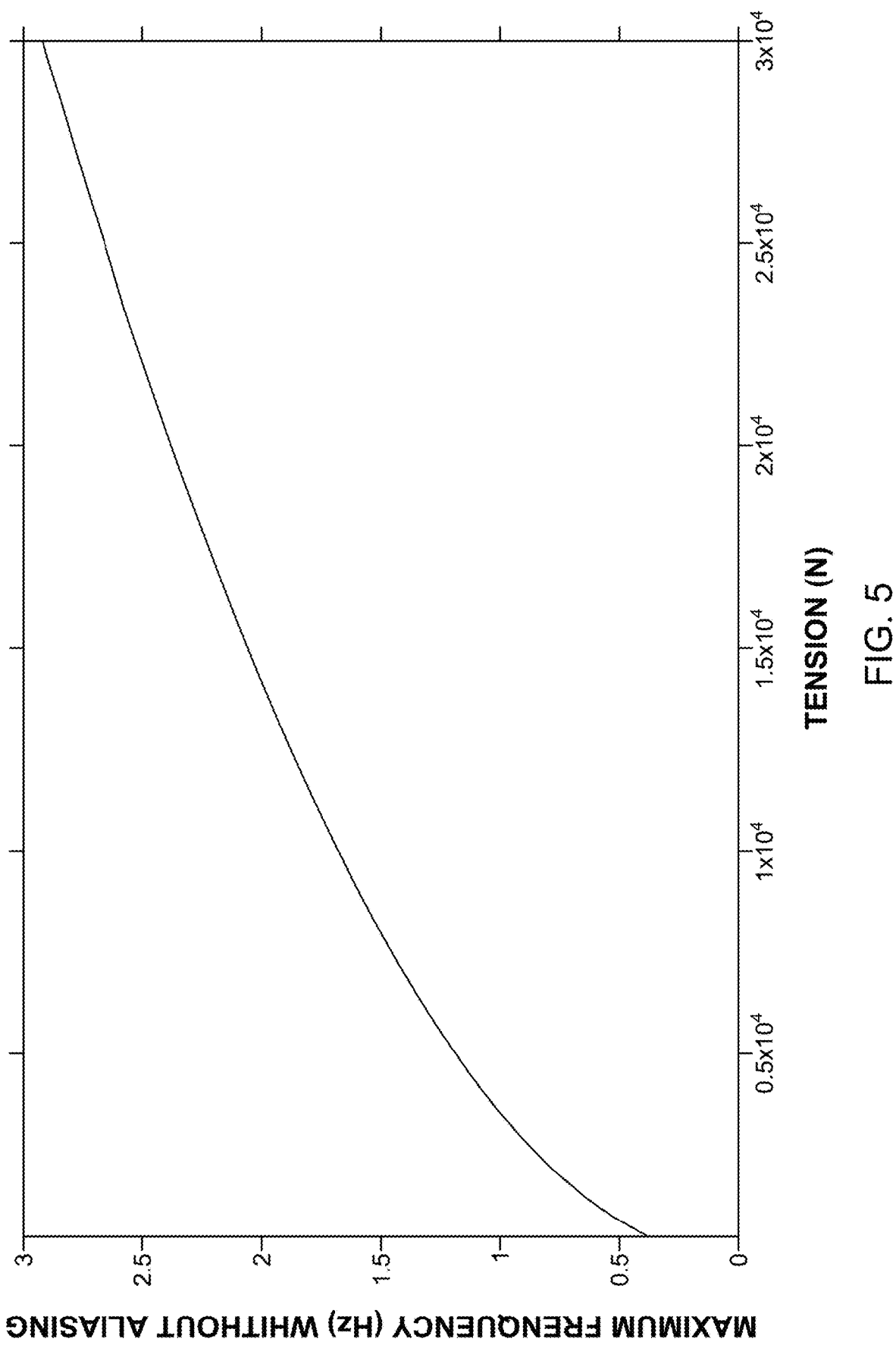
FIG. 5 plots the tension existing in the streamer when towed in water and the temporal frequency at which the first aliasing appears for the given tension.

As shown in FIG. 5, for the usual tensions existing in a streamer (which are between 5,000 and 20,000N, as indicated on the X axis), a very small frequency range is obtained (see Y axis) when compared to the total signal bandwidth. The maximum frequency without aliasing shown in FIG. 5 has been calculated with D=12.5 m, a streamer diameter d=0.060 m, and an effective cable density of 2,050 kg/m³.

Figure 6A:
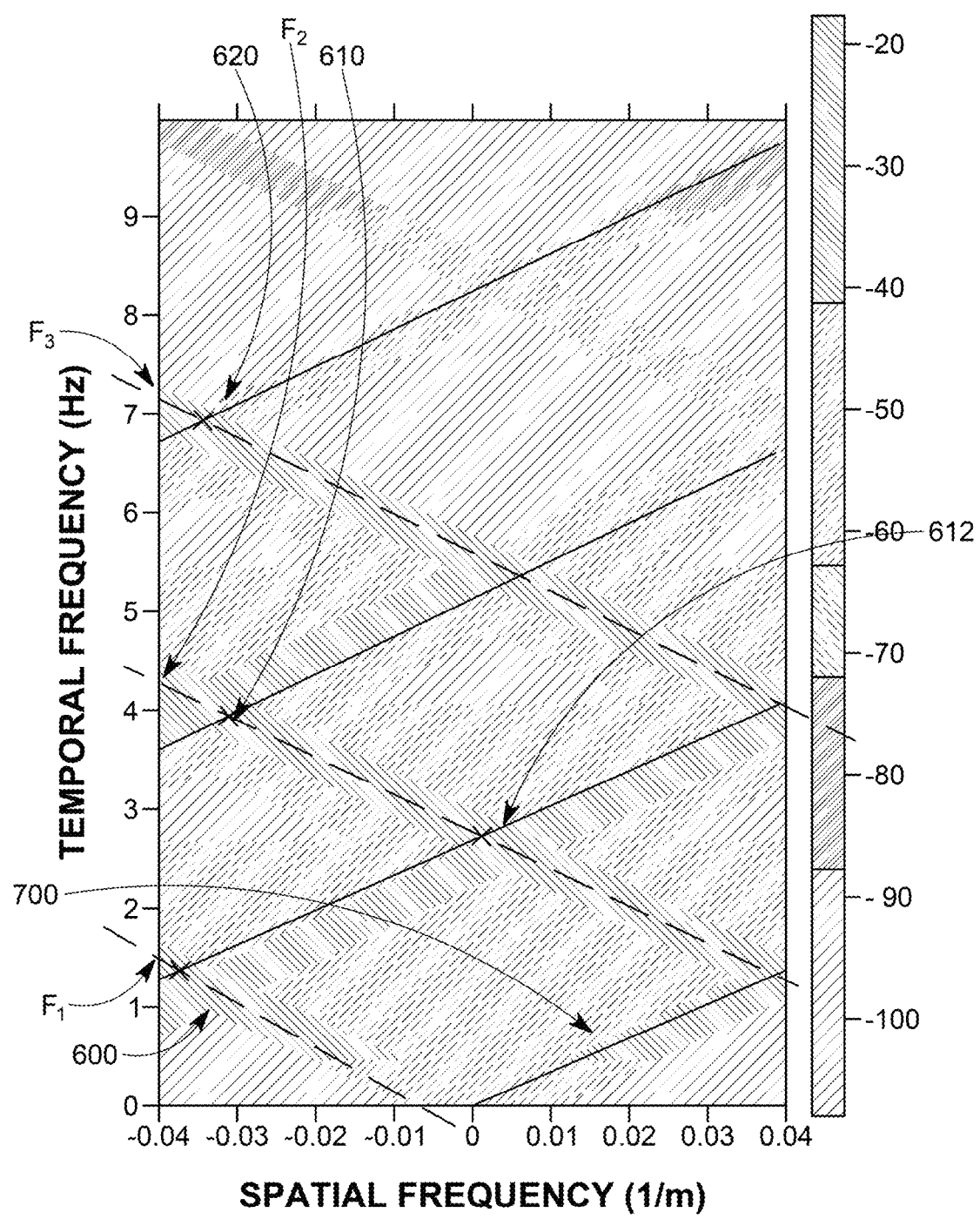
FIG. 6A shows data transformed into the FK domain and FIG. 6B shows the same data being periodized by a factor C.
Figure 6B:
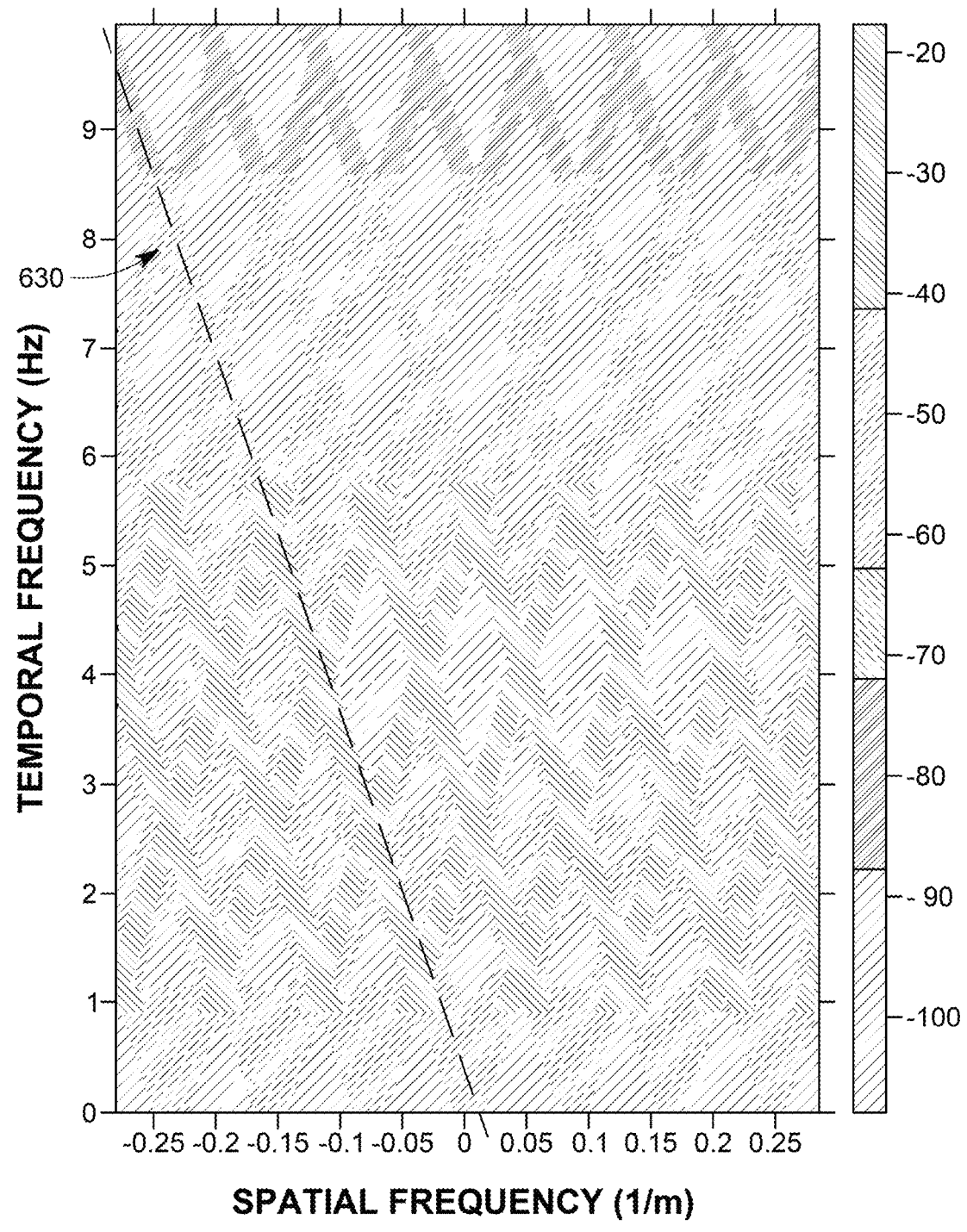

Returning to the flow chart of FIG. 4, the method advances to step 404 for periodizing, according to the spatial dimension, the FK data F(f, k), by a factor C, to obtain the data Fp(f, k) of size [n, (2m+1)C]. In this regard, the sampling theory shows that periodization in one domain is equivalent to oversampling in the dual Fourier domain. Thus, periodizing the Fourier transform F(f, k) data according to the spatial frequency dimension is equivalent to spatially oversampling the seismic signal spatially. This will have the effect of "unwrapping" the transverse waves. In this regard, FIG. 6A shows the Fourier transformed data F(f, k) for n=25,000 and m=21 while FIG. 6B shows the periodized Fourier transformed data Fp(f, k) for C=7. By periodizing the FK data F(f, k) by a sufficiently large factor C, the vibration waves can be unwrapped over the entire range of time frequencies. FIG. 6A shows a downward wave 600, a first aliased frequency F1 (1.5 Hz in this case), a second aliased frequency F2 (4.2 Hz in this case), a third aliased frequency F3 (7.1 Hz in this case) and an upward wave 700. Because of the aliasing, the downward and upward waves overlap each other, for example at the points 612, 610, 620. FIG. 6A also shows the FK energy in dB. FIG. 6B shows the periodization of the FK data F(f, k) with C=7. This means that the data F(f, k) has been repeated 7 times along the X axis, which corresponds to duplicating it 7 times in the X direction. From FIG. 6B, it can be seen that the downward waves 630 can be unwrapped and these waves are no longer aliased to a frequency of about 9 Hz. To achieve a higher frequency, it would be sufficient to periodize the FK data with a higher C-factor.

Note that oversampling is an artificial process and in no way limits the spectral aliasing, so there is always an overlap between upward and downward waves in the Fourier domain. The C factor can be defined using the following formula:

$$C = \text{round}\left\{\frac{2D f_{max}}{v p(f_{max})}\right\}$$

with $f_{max}$ being the time frequency for which it is desired that the first aliasing occurs. For a typical application, the C-factor is selected to be between 15 and 25, for example 20. Other values may be used for the C-factor.

Figure 7:
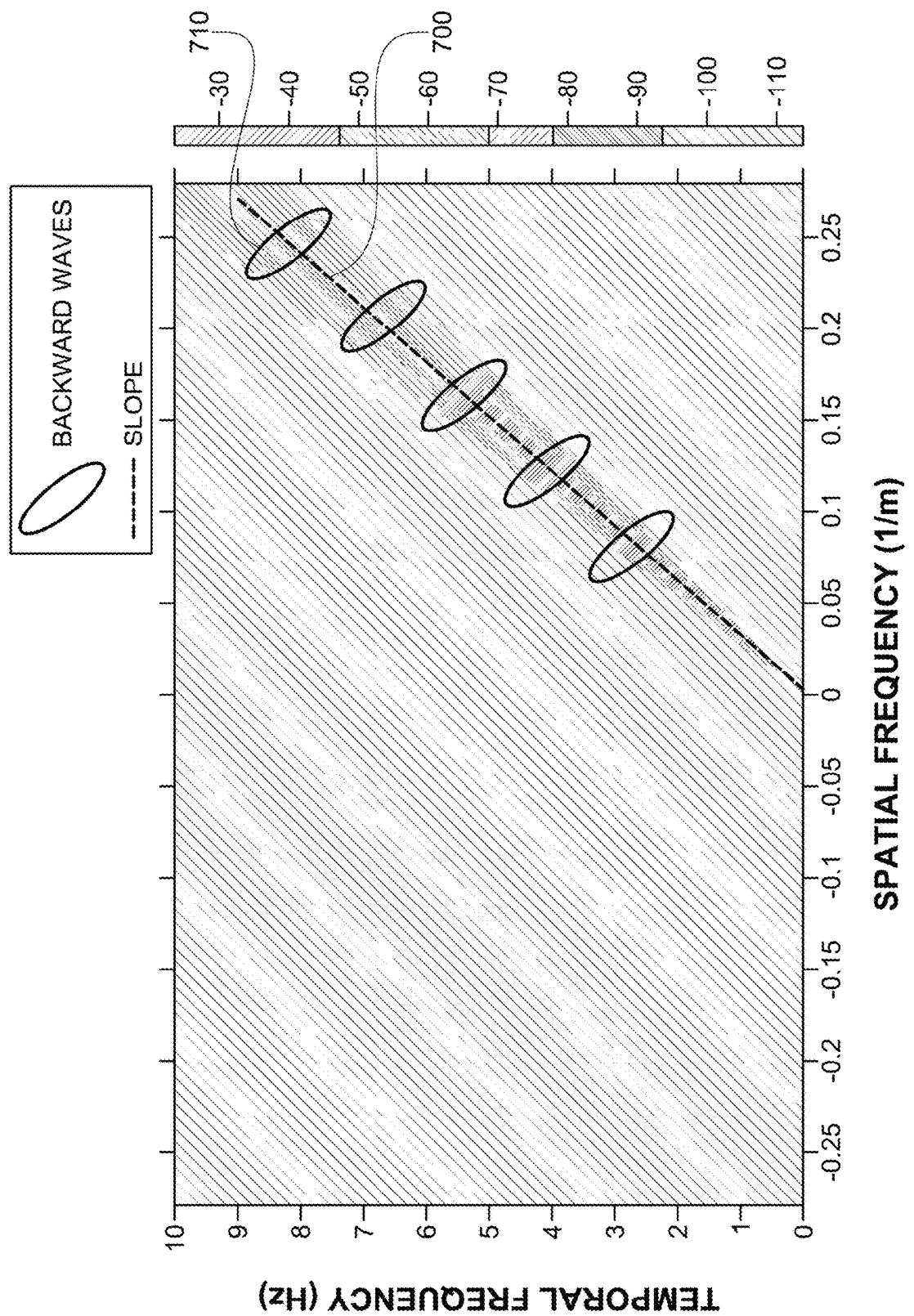
FIG. 7 shows the data in the FK domain after applying a correctly defined mask and how the speed of the wave is associated with the slope of the FK.
Figure 8:
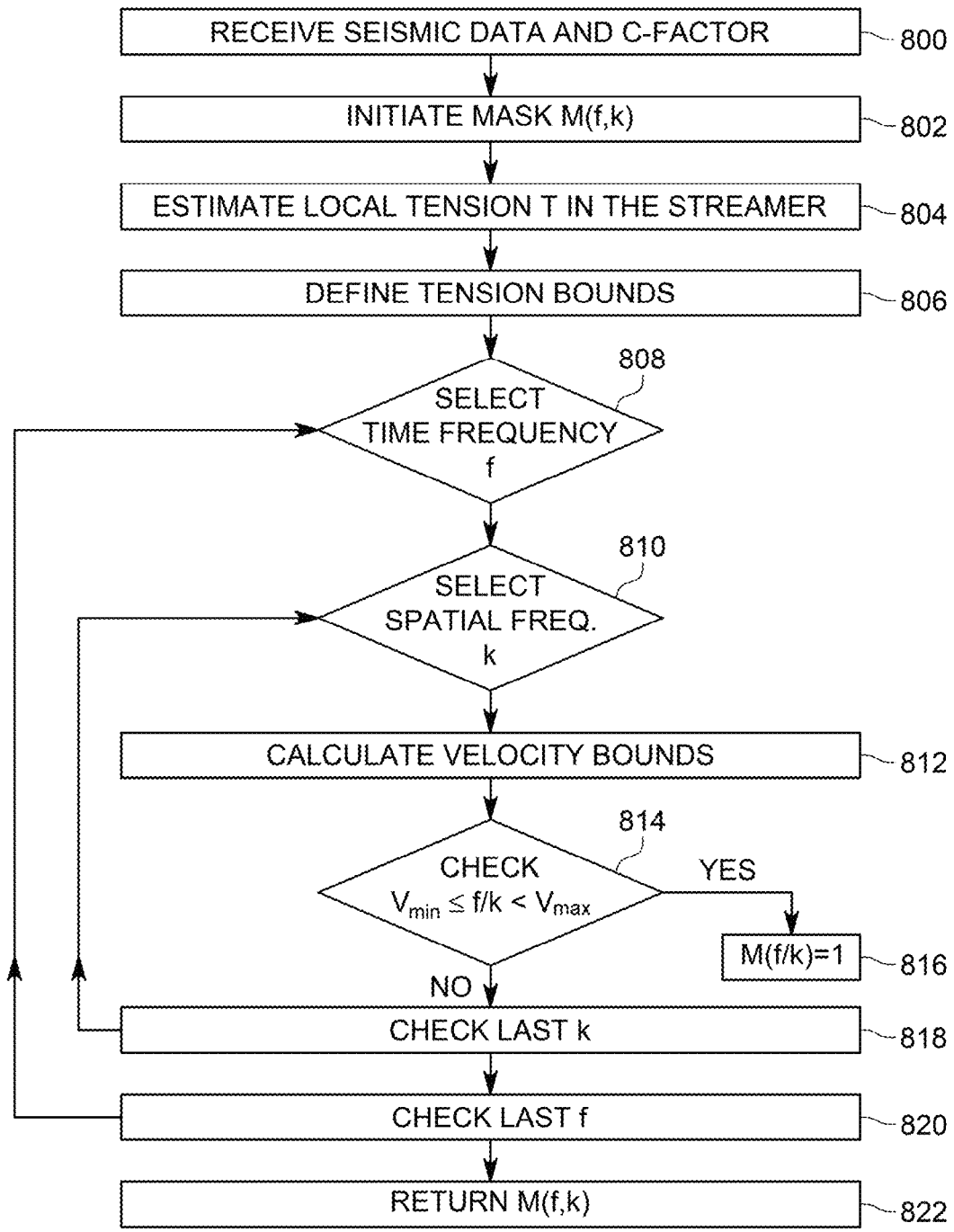
FIG. 8 is a flow chart for calculating a mask that is applied to the data in the FK domain for determining the velocity of the transverse wave.

The method than advances to step 406, where a mask M(f, k) is defined to isolate the upward and downward waves in the FK space. The mask M(f, k) has the same size as the Fp(f, k) data. The selection of the mask is discussed in more detail with regard to FIG. 8. After selecting the mask, the method advances to step 408, where the mask M(f, k) is applied to the periodized data Fp(f, k), to obtained the selected data Wm(f, k)=Fp(f, k)·M(f, k). In this regard, the FK representation of the collected data Dt shows the wave velocity, as illustrated in FIGS. 6A and 6B. This is because the frequency components travelling at the same velocity appear in the FK diagram as lines. It is therefore a question of estimating the slope of the wave (upward or downward). The main problem is the backward waves that interferes with the measurement. This situation is illustrated in FIG. 7, which plots the temporal frequency f versus the spatial frequency k. It is noted that the slope 700 corresponds to the wave velocity, but the backward waves 710 negatively interfere with the slope. A method for measuring the upward and downward speeds is discussed later.

The method then advances to step 410, where a sample corresponding to the spatial frequency vector k is selected, and in step 412 a sample of the time frequency vector f, which maximizes the masked data Wm(f, k), is selected to be $f_{max}$. More specifically, in step 412, the $f_{max}$ is calculated by using the relationship $$f_{max} = \max_f |W(f, k)|.$$

This value together with the corresponding $f_{max}/k$ values (which are the velocities associated with the most energetic temporal frequency) are then stored in step 414 in a list L1. The method verifies in step 416 that all samples k were considered. If this is not the case, the method returns to step 410 for selecting another sample of k.

If all the samples were considered, the method advances to step 418 to select a sample that corresponds to the temporal frequency vector f and calculates in step 420 the sample of the spatial frequency vector k that maximizes the masked data Wm(f, k). More specifically, in step 420, the kmax is calculated by using the relationship $$k_{max} = \max_k |W(f, k)|.$$

This value together with the corresponding f/kmax values (which are the velocities associated with the most energetic spatial frequency) are then stored in step 422 in a list L2. The method verifies in step 424 that all samples f were considered. If this is not the case, the method returns to step 418 for selecting another sample f.

If all the samples f were considered, then the method calculates in step 426 the velocity of the upward or downward waves that minimize a regression error applied to the lists L1 and L2. More details about this step are discussed later with regard to FIG. 11. Finally, the method outputs in step 428 the phase velocity vector vp(f) as a function of the time frequencies f.

It is noted that the obtained phase velocity vector vp(f) takes into account the dispersive nature of the waves and the velocity thus obtained is not only that associated with the most energetic frequency component, as is in the '840 patent, but it is associated with a spectrum of temporal frequencies f. In this way, the present method allows, from a set of traces, to obtain an increased stability compared to the correlation methods. Finally, it also has the advantage of being able to characterize, separately, the velocity of the upward and downward waves, and to provide an indicator on the dominant waves on the traces involved The selection of the mask M(f, k) in step 406 is now discussed with regard to the flow chart of the method illustrated in FIG. 8. According to this method, in step 800, the seismic data of size [n, (2m+1)] and the C-factor (the periodization factor) are received as input. In step 802, a matrix M(f, k), i.e., the mask, is created to have a size n by (2m+1)C, and it is initialized to have all entries zero. In step 804, the local tension T of the streamer is estimated. The local tension T was estimated in the '840 patent to be related to the wave speed as follows:

$$v_p(k, x) = \pm \frac{2}{d}\sqrt{\frac{T(x) + 4 \cdot \pi^2 \cdot k^2 \cdot EI}{\pi \rho_a}} \text{ with} \quad (1)$$

$$\rho_a = (\rho_c + \rho_w),$$

where $v_p$ is the speed of the transverse wave (m/s), k is the wave number (m$^{-1}$), x is a position along the streamer, d is the streamer diameter, T(x) is the streamer tension at position x along the streamer, EI is the product of rigidity in flexion (Nm$^2$), $\rho_c$ is the density of the streamer (kg/m$^3$), it is about 1025 kg/m$^3$), and $\rho_w$ is the density of the seawater, about 1025 kg/m$^3$.

The model described by equation (1) can be used to relate the velocity of a transverse wave, which propagates along the streamer, to the temporal frequency f, when replacing k by $$\frac{f}{v_p}$$

as follows:

$$v_p(f, T) = \pm \sqrt{\frac{2T}{d^2 \pi \rho_a}\left(1 + \sqrt{1 + \frac{4\pi^3 \rho_a d^2 f^2 EI}{T^2}}\right)}. \quad (2)$$

Figure 9A:
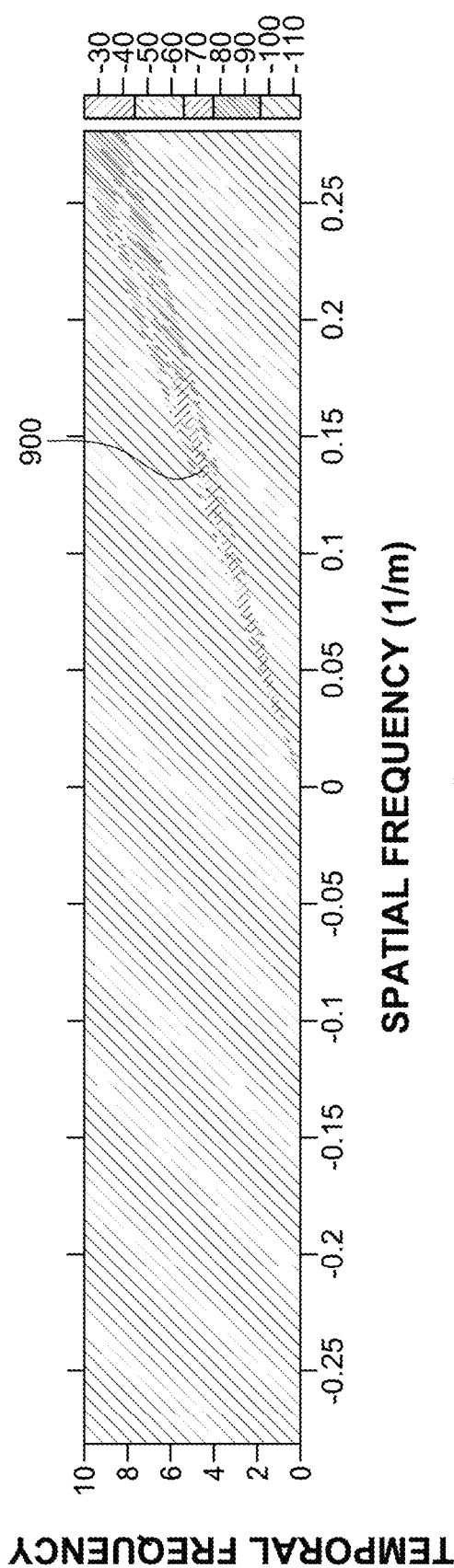
FIGS. 9A to 9C show various possibilities for adjusting the size of the mask.
Figure 9B:
Figure 9C:
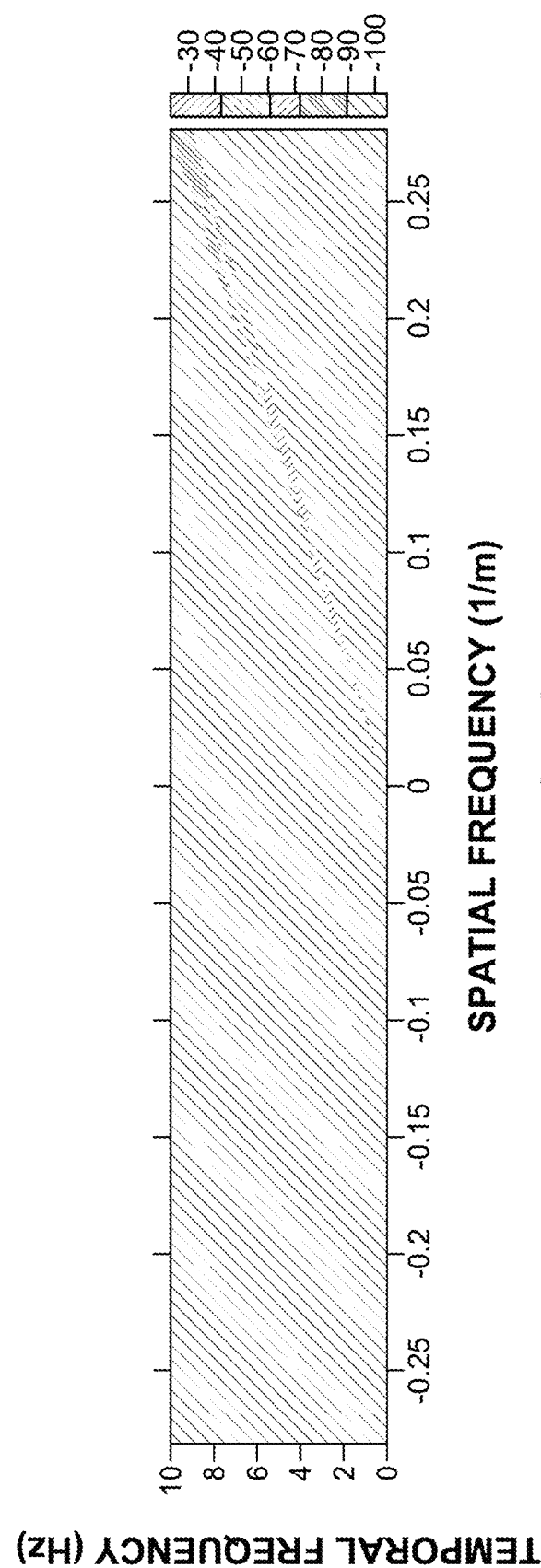

Other models can be used for modeling the dependency of the transverse wave velocity to the tension in the streamer, i.e., the model-based velocity vp(f, T). The method then advances to step 806, where the tension bounds (Tmin and Tmax) are defined. The models noted above (speed and tension relationship) allow to define the dispersion relationship vp(f) of the vibration waves based on a single parameter, which is the tension T. It is thus possible to estimate the bounds of the dispersion relationship by considering a tension variation ΔT around the estimated tension T. The mask M(f, k) needs to be large enough to overcome a possible bias in the estimation of T, but not too large to avoid the risk of catching the aliased parallel waves. In this regard, FIG. 9A shows a mask M that is ideal, i.e., not too narrow or to broad, so that a single speed 900 is captured. FIG. 9B shows a mask that includes multiples 902 of the speed 900 that needs to be extracted, i.e., this mask is too wide. FIG. 9C shows a mask that is too thin, and not enough information is retained to calculate the speed.

Figure 10:
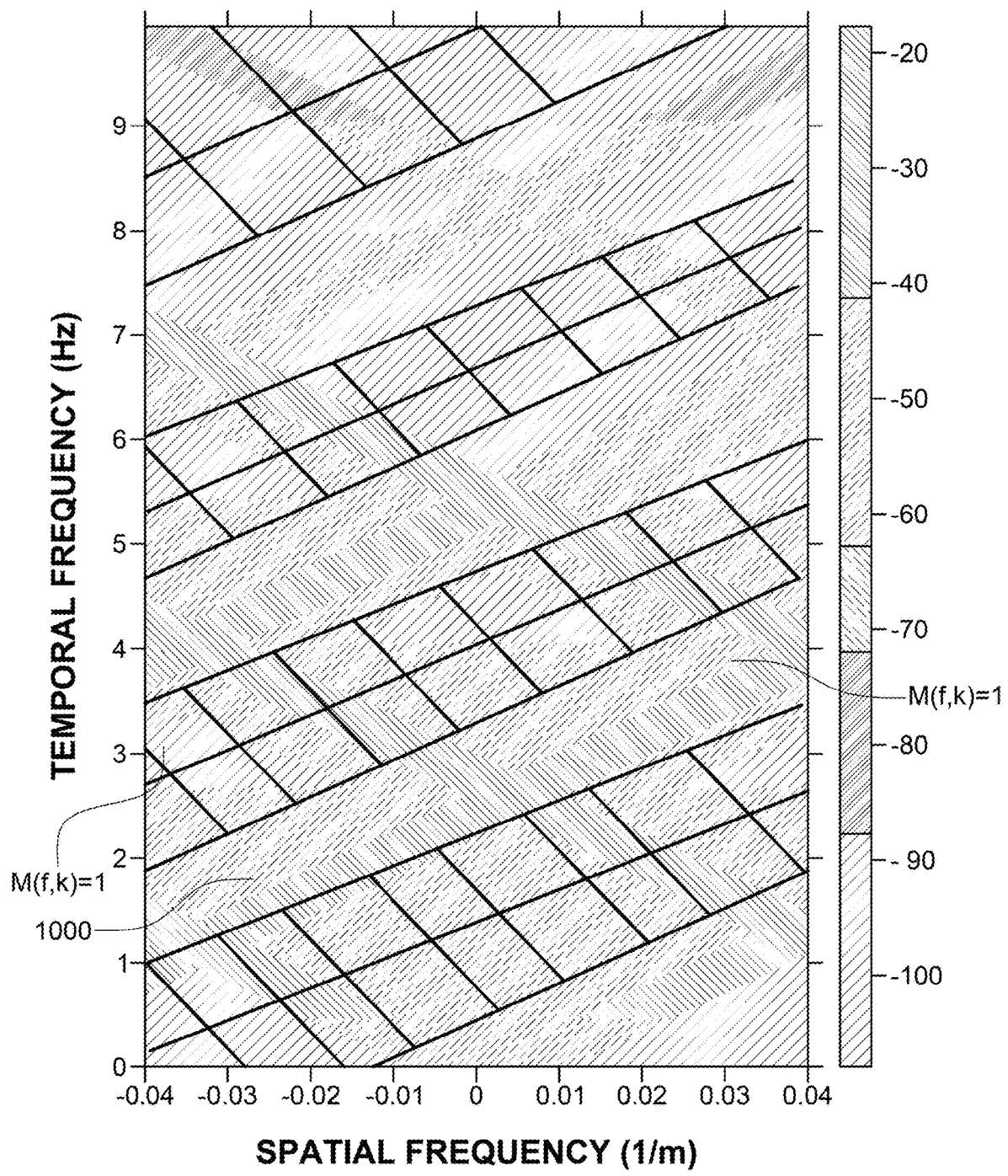
FIG. 10 shows another mask that may be used to determine the velocity of the transverse wave from the data in the FK domain.

In this regard, as the mask M(f, k) is used to extract the wave for which there is the desire to estimate its velocity, the mask needs to be sized to capture only the desired wave. If there was no aliasing, the mask M(f, k) could be applied without the periodization step. Due to aliasing, the FK data needs first to be periodized before the mask M(f, k) can be applied. However, the periodization step has the effect of showing multiples of the wave to be estimated. This is why the mask should not be too large to avoid containing these multiples. In one application, the method could be implemented without the periodization step, and for this case, it is possible to adopt an aliased mask which would allow, in the same way, to isolate the wave 1000 whose velocity is desired to be estimated, as shown in FIG. 10. FIG. 10 shows how parts of the mask have the zero value and other parts have the one value, for selecting the wave 1000. Those skilled in the art would understand that instead of the zero value, a window could be used to make the border smoother.

Returning to FIG. 8, the method advances to step 808 to select a time frequency f and to step 810, to select a spatial frequency k. Then, in step 812, the velocity bounds $v_{min}$ and $v_{max}$ are associated with the tension bounds Tmin and Tmax and the time frequency f. Note that in one embodiment, step 812 may be performed before step 810 to not recalculate the velocity bounds for each value of k. The velocities $v_{min}$ and $v_{max}$ correspond to the lower and upper limits of the transverse wave velocities that can be expected on the considered traces. To find these two limits, and their evolution as a function of the frequency, this embodiment uses an a priori relationship of the transverse wave velocity given by the model described by equations (1) or (2). Thus, by having an estimate of the tension $T_{est}$ on the considered traces, it is possible to obtain the bounds $v_{min}$ and $v_{max}$ by considering a tension range of the estimate ΔT as follows:

$$v_{min} = v_p(n_f T_{est} - \Delta T), \text{ and}$$

$$v_{max} = v_p(n_f T_{est} + \Delta T),$$

where $v_p$ is the speed of the transverse wave, $n_f$ is temporal frequency index, and $T_{est}$ is the tension estimated using any known model in the art. The tension delta ΔT needs also to be adjusted, which will allow to adjust the width of the mask. The purpose of this parameter is to compensate for a possible error on the tension estimation or a possible bias of the model. However, it should not be too large (see FIG. 9B), at the risk of catching an artifact transverse wave that appears when the mask is unwrapped.

As can be seen in FIGS. 9A to 9C, the tension variation ΔT can have a great influence on the extraction of the transverse waves. Thus, a too small tension delta, as is the case in FIG. 9C, does not offer a sufficient margin of error. Thus, it does not compensate for the velocity spread and a part of the transverse waves seems to come out of the filter cone. However, if this parameter is increased, as is the case in FIG. 9B, it can be seen that the cone becomes too wide and it catches transverse wave artifacts resulting from the unfolding of the FK data.

It is then understood that the parameter ΔT is a determining factor in the determination of the mask. In this respect, it can be shown that the derivative of the transverse wave velocity with respect to the tension is a decreasing function of the tension, a result that can also be found graphically in FIGS. 9A to 9C. This means that the same variation in the tension ΔT will result in a greater difference in speed for a low tension than for a high tension. Therefore, the tension variation ΔT needs to decrease with the tension, otherwise there is a risk of obtaining a cone that is too wide. In one application, an empirical criterion for selecting the tension variation ΔT is by taking the ΔT to be 20% of $T_{est}$, which is the case for FIG. 9A.

In step 814, the velocity f/k is calculated for the selected time frequency f and the selected spatial frequency k. If the calculated velocity f/k is larger than $v_{min}$ and smaller than $v_{max}$, the entry f, k for the mask M(f, k) is assigned the value of one in step 816. If the calculated velocity f/k is out of bounds, then the value of the mask is not changed and the method advances to step 818 for checking if all the spatial frequencies k have been considered. If the answer is no, the method returns to step 810. If the answer is yes, the method advances to step 820, for checking if all the temporal frequencies f have been considered. If the answer is no, the method returns to step 808. If the answer is yes, the method advances to step 822 and outputs the mask M(f, k).

Figure 11:
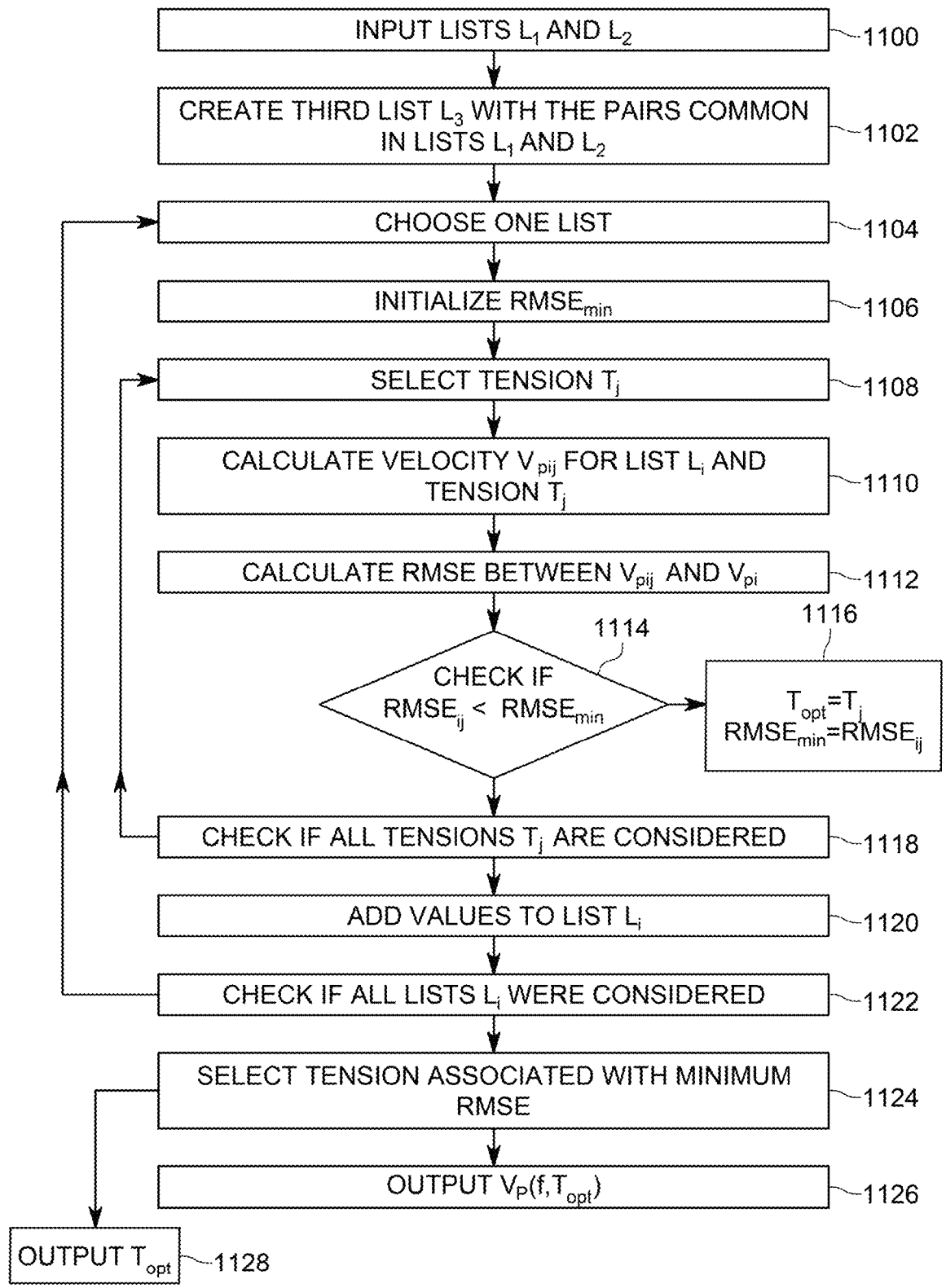
FIG. 11 is a flow chart that uses a model-guided regression for estimating the velocity of the transverse wave as a function of the frequency.
Figure 12:
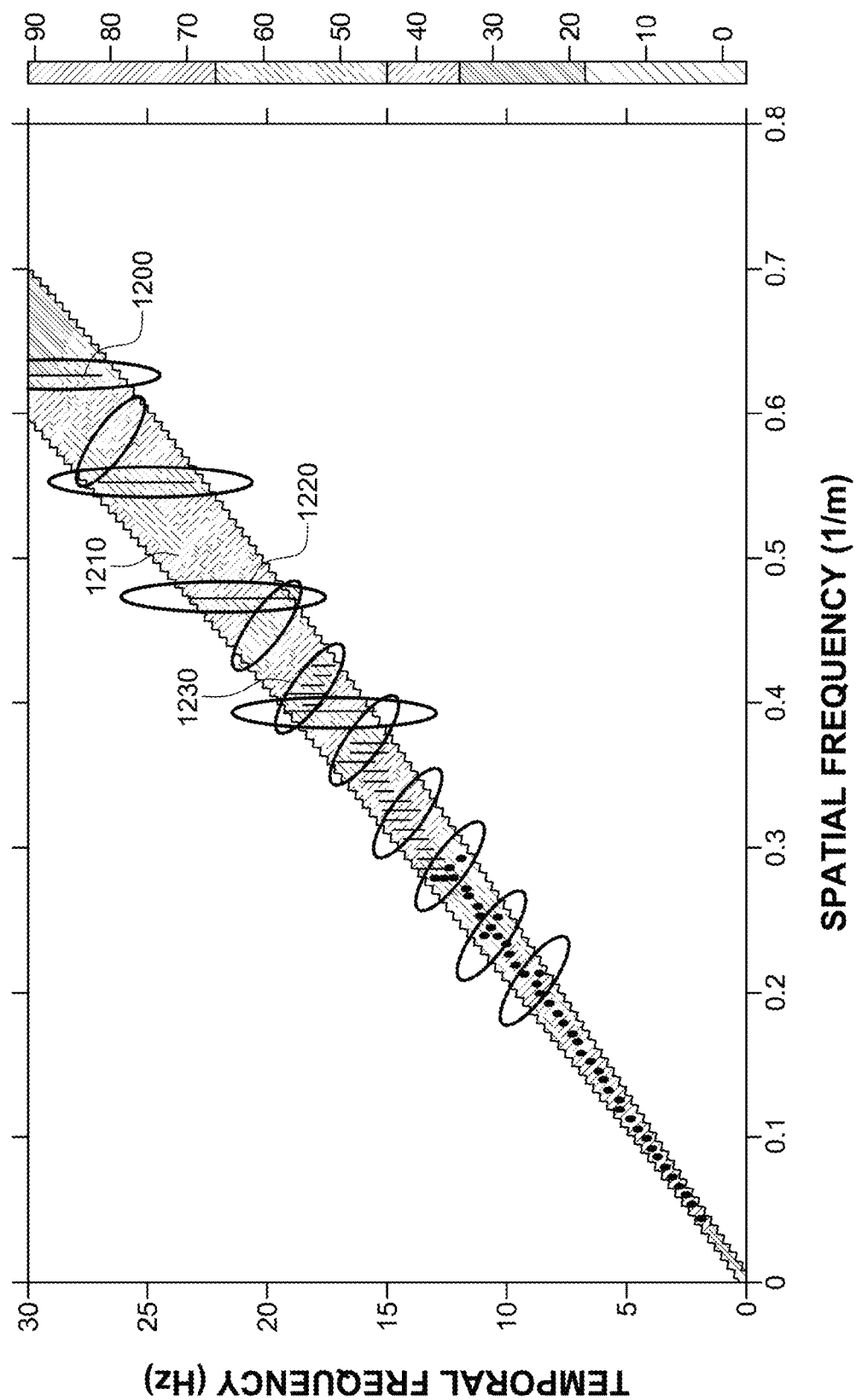
FIG. 12 illustrates the spatial and temporal frequencies associated with the maximum transverse wave energies in the FK domain.

The step 426 discussed above with regard to the method illustrated in FIG. 4, for calculating the velocity of the upward or downward wave that minimizes a regression error applied to the lists L1 and L2, is now discussed in more detail with regard to the flow chart illustrated in FIG. 11. To estimate the speed of the transverse waves, this method determines, as discussed next in more detail, for each temporal frequency f, the spatial frequency k of the "masked" FK data with the highest energy. Thus, the method obtains pairs of points that allow to deduce the velocity of the isolated transverse wave (up or down) for each temporal frequency based on the equation:

$$v_p = \frac{n_{f,max}}{n_k},$$

for the L1 list, where $n_{f,max}$ is selected to maximize the masked data Fp(f, k), and $$v_p = \frac{n_f}{n_{k,max}},$$

for the L2 list, where $n_{k,max}$ is selected to maximize the masked data Fp(f, k). In the same way, the method also searches for maximums according to the spatial frequencies. FIG. 12 shows the maximum temporal frequencies 1200 and the maximum spatial frequencies 1210. Note that the FK data plotted in FIG. 12 has been obtained with a Test=11.1 kN, tension variation ΔT=2 kN for a 50s time interval for about 11 traces (m=5), within a frequency band of 0 to 30 Hz.

It can be observed that, due to the high temporal sampling, many more point pairs are obtained by selecting the maximums according to f than according to k. It is also noted that some maximums do not correspond to the up wave, due to the aliased shots (those surrounded by a solid line 1220). This problem is particularly present if the maximums according to f are considered. Indeed, the strong verticality of the shot on the FK data (high-propagation speed) makes it less detectable along the x-axis. In the same way, the downward transverse waves are also spotted (dashed lines 1230) in some frequency bands.

From these different frequency pairs, it is then possible to make a change of reference from the (k, f) domain to the (f, vp) domain to find the transverse wave velocity vp(f), as now discussed. This method is now discussed in more details, and starts in step 1100 by receiving the lists L1 and L2. The first list L1 corresponds to the pairs obtained from the maximums on the spatial frequencies k, and the second list L2 corresponds to the pairs obtained from the temporal frequencies f. The time frequencies in list i are noted fi and the associated velocities are noted vpi. In step 1102, a third list L3 is created, that includes all the pairs that are common in lists L1 and L2. Each list contains two vectors of the same size fi and vpi, where vpi is the velocity of the wave associated with the temporal frequency fi. In step 1104, a list Li is selected and in step 1106 the minimum root mean square error, RMSEmin, is initiated with a large value, for example, the infinity. Then, in step 1108, a tension Tj is selected. For example, a tension vector from 0N to 100 kN can be defined with a tension step of 100N. A dichotomy approach could reduce the calculation time but this would require the problem to be convex, which is not guaranteed.

Figure 13:
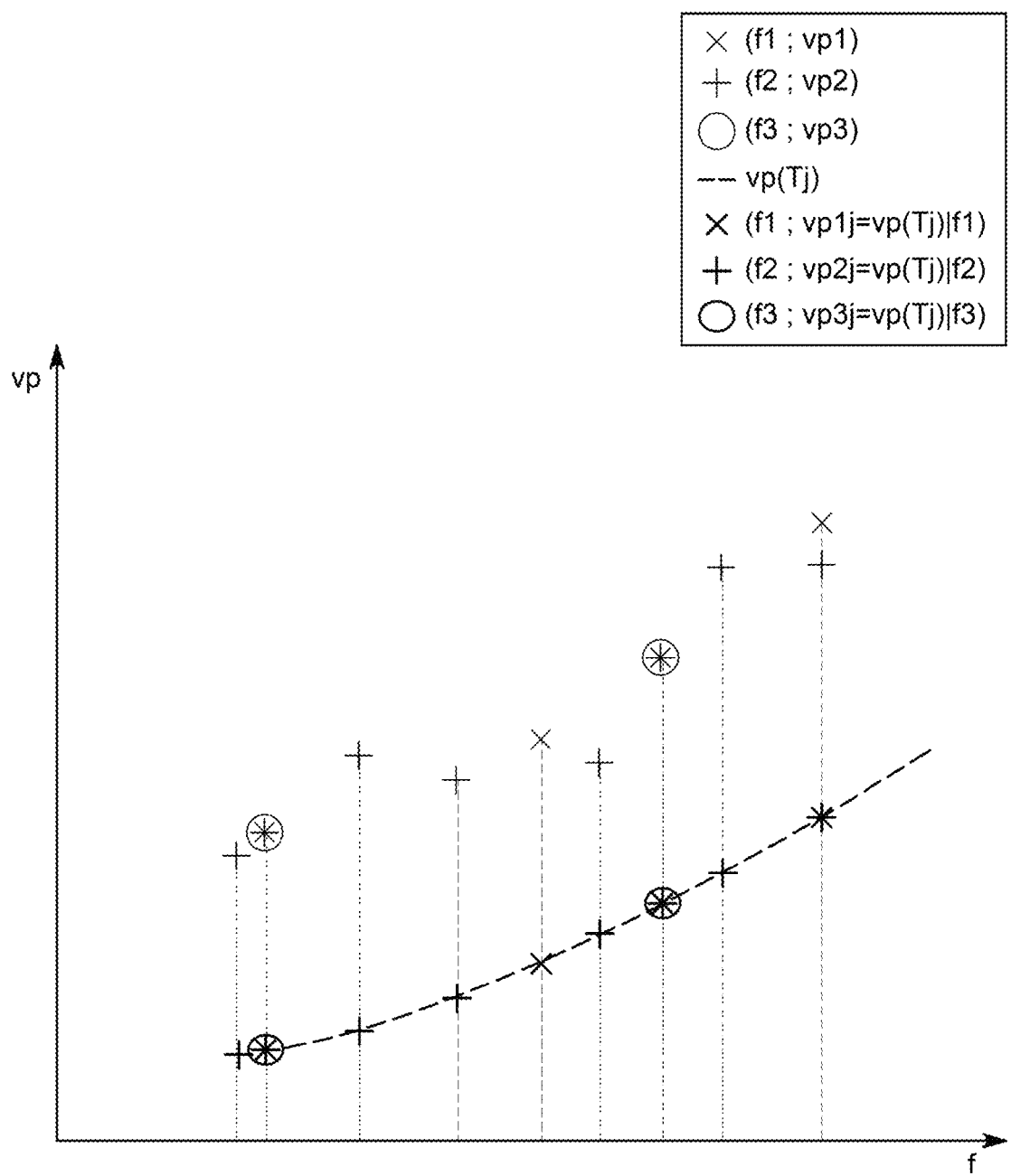
FIG. 13 illustrates pairs of velocities and corresponding temporal frequencies determined with the mask noted above in the FK domain.

In step 1110, the velocities vpij (the model-based velocities) associated with the list Li's time frequencies and the tension Tj are calculated, based, for example, on the relationships discussed above with regard to equations (1) and (2). FIG. 13 exemplifies the same idea by indicating the various pair of values from the lists L1 to L3. In step 1112, the RMSE between the vpij and the vpi (the phase velocities) is calculated, and this quantity is called herein RMSEij. Note that the velocities vpij were calculated based on the models (1) or (2) or other model, while the velocity vpi was obtained from the lists Li, which were calculated by the periodization of the FK data, masking the data, and then calculating the slope of the various waves. In other words, the two sets of velocities, vpij and vpi were calculated based on different approaches.

In step 1114, the calculated RMSEij between the two velocities is compared to the RMSEmin, and if the calculated RMSEij is smaller, than the method advances to step 1116 and assigns the value Tj to Topt, and the value RMSEij to RMSEmin. If the RMSEij is larger or equal to RMSEmin, the method advances to step 1118 and checks if all the tensions Tj have been considered. If the answer is no, the method returns to step 1108. If the answer is yes, the method advances to step 1120 and adds the pair of values RMSEmin, i, and Topt,i to the list Li. Next, the method verifies in step 1122 if all the lists Li were considered. If the answer is no, the method returns to step 1104. If the answer is yes, the method advances to step 1124 and selects the tension associated with the minimum of the RMSE values, and outputs in step 1126 the value of the velocity vp(f, Topt), which is the velocity of the upward or downward wave that minimizes the regression error (see steps 1114 and 116) applied to the lists L1 and L2. Additionally, or alternatively, the method may advance to step 1128 for outputting the value of the tension Topt, i.e., the tension estimated with the method discussed herein is optimized vs. the tension originally taken into consideration for the determination of the velocity.

The RMSE used in the above steps may be defined by:

$$RMSE(x, y) = \sqrt{\frac{1}{N}\sum_{i=1}^{N}(x_i - y_i)^2},$$

where x and y are two vectors of size N. The RMSE is only one criteria that may be used to find the best velocity. Other measures for estimating the distance between the velocities vpij and vpi may be used.

Figure 14:
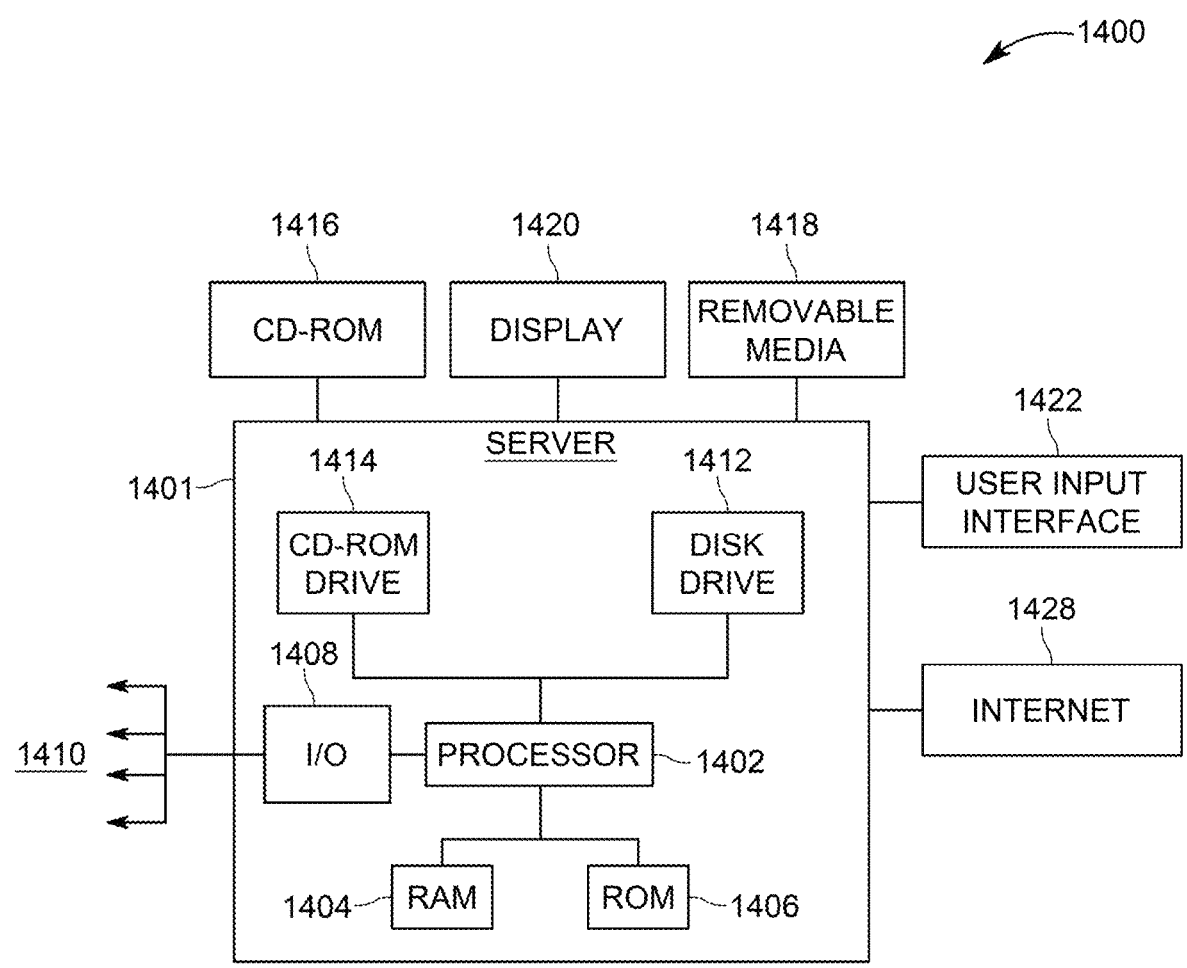
FIG. 14 is a schematic diagram of a computing device that can run the methods discussed herein.

The above-discussed procedures and methods may be implemented in a computing device as illustrated in FIG. 14. Hardware, firmware, software or a combination thereof may be used to perform the various steps and operations described herein. Computing device 1400 suitable for performing the activities described in the exemplary embodiments may include a server 1401. Such a server 1401 may include a central processor (CPU) 1402 coupled to a random access memory (RAM) 1404 and to a read-only memory (ROM) 1406. ROM 1406 may also be other types of storage media to store programs, such as programmable ROM (PROM), erasable PROM (EPROM), etc. Processor 1402 may communicate with other internal and external components through input/output (I/O) circuitry 1408 and bussing 1410 to provide control signals and the like. Processor 1402 carries out a variety of functions as are known in the art, as dictated by software and/or firmware instructions.

Server 1401 may also include one or more data storage devices, including hard drives 1412, CD-ROM drives 1414 and other hardware capable of reading and/or storing information, such as DVD, etc. In one embodiment, software for carrying out the above-discussed steps may be stored and distributed on a CD-ROM or DVD 1416, a USB storage device 1418 or other form of media capable of portably storing information. These storage media may be inserted into, and read by, devices such as CD-ROM drive 1414, disk drive 1412, etc. Server 1401 may be coupled to a display 1420, which may be any type of known display or presentation screen, such as LCD, plasma display, cathode ray tube (CRT), etc. A user input interface 1422 is provided, including one or more user interface mechanisms such as a mouse, keyboard, microphone, touchpad, touch screen, voice-recognition system, etc.

Server 1401 may be coupled to other devices, such as sources, detectors, etc. The server may be part of a larger network configuration as in a global area network (GAN) such as the Internet 1428, which allows ultimate connection to various landline and/or mobile computing devices.

Figure 15:
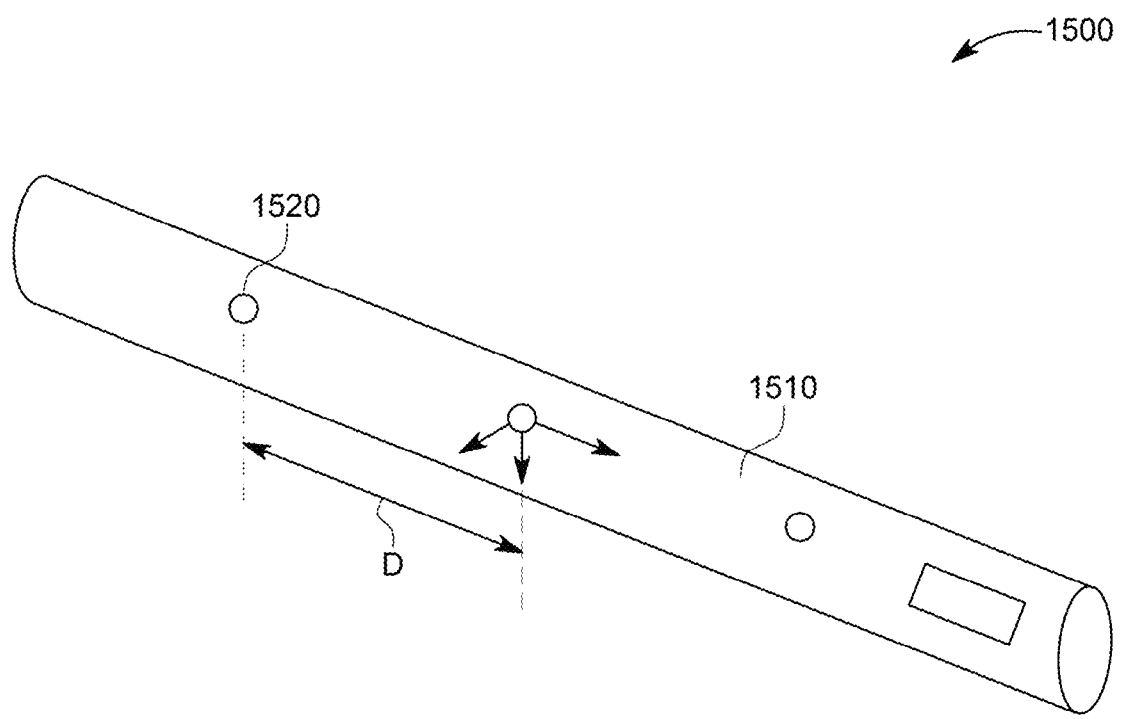
FIG. 15 schematically illustrates a portion of a streamer and associated sensors.

The methods discussed above may be implemented, for example, in the computing device 1400. The inputs used for calculating the velocity and tension discussed above are: the streamer specifications (e.g., diameter, density, length), and the accelerations or velocities or displacements. FIG. 15 shows a portion of a streamer (or antenna) 1500 having a body 1510 within which plural motion sensors 1520 are located. The motion sensor 1520 are linked to a computing device, which may be the computing device 1400 discussed above with regard to FIG. 14. The figure shows only three motion sensors 1520 distributed along the streamer 1500 with a predetermined space D. FIG. 12 also indicates the inline direction X along the length of the streamer, the cross-line direction Y perpendicular to the inline indirection and in the water plane, and a third direction Z perpendicular on both the X and Y directions.

Figure 16:
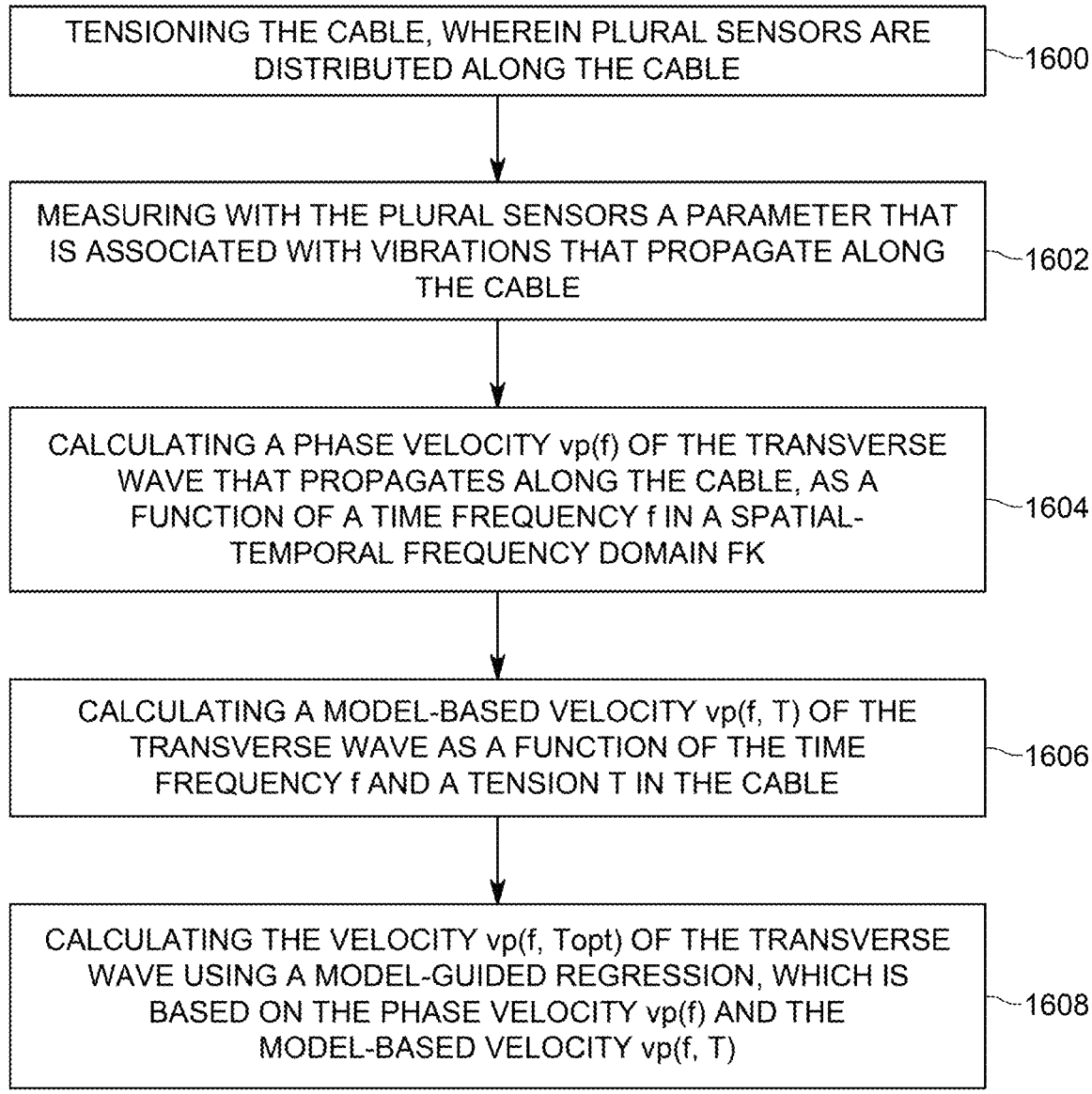
FIG. 16 is a flowchart of a method for calculating the velocity of the transverse wave, which propagates along the streamer, as a function of the frequency.

Some methods for monitoring the tension in the streamer (antenna) and/or measuring the velocity $vp(f, T_{opt})$ discussed above are now presented. Note that the embodiments discussed above apply to any antenna towed in water and having sensors within or attached to the body of the antenna. FIG. 16 is a flowchart of such a method. The method includes a step 1600 of towing the streamer 1510 in water, where the streamer 1500 includes plural sensors 1520 distributed along the streamer, a step 1602 of measuring with the plural sensors 1520 a parameter that is associated with vibrations that propagate along the streamer 1510, a step 1604 of calculating a phase velocity $vp(f)$ of the transverse wave that propagates along the streamer 1510, as a function of a time frequency f in a spatial-temporal frequency domain FK, a step 1606 of calculating a model-based velocity $vp(f, T)$ of the transverse wave as a function of the time frequency f and a tension T in the streamer 1510, and a step 1608 of calculating the velocity $vp(f, T_{opt})$ of the transverse wave using a model-guided regression, which is based on the phase velocity $vp(f)$ and the model-based velocity $vp(f, T)$. The velocity $vp(f, T_{opt})$ is a function of the temporal frequency f.

The step of calculating the phase velocity $vp(f)$ includes receiving data Dt associated with the parameter measured with the plural sensors, wherein the parameter may be an acceleration, velocity, displacement, or pressure, and the parameter is measured in the time-space domain; transforming the data Dt from the time-space domain to the FK domain to obtain the FK data $F(f, k)$, wherein k is the spatial frequency, periodizing the data $F(f, k)$ according to the spatial frequency k, wherein a factor C is used to replicate the data $F(f, k)$ to obtain the periodized data $Fp(f, k)$, defining a mask $M(f, k)$ in the FK domain to isolate an upward or downward wave, and applying the mask $M(f, k)$ to the periodized data $Fp(f, k)$ to obtained the masked data $Wm(f, k)$.

The step of defining the mask includes estimating a local tension on the streamer, defining a minimum tension Tmin and a maximum tension Tmax, for each time frequency f, and for each spatial frequency k, calculating a minimum velocity vmin and a maximum velocity associated with the Tmin and Tmax, respectively, and for each velocity f/k that is larger than vmin and smaller than vmax, making an element f, k of the mask $M(f, k)$ to be one.

The method may further include generating a first list L1, for each of the spatial frequency k, that includes (1) a frequency fmax that maximizes the masked data $|Wm(f, k)|$, and (2) a first speed fmax/k, generating a second list L2, for each the temporal frequency f, that includes (i) the spatial frequency kmax that maximizes the masked data $|Wm(f, k)|$, and (2) a second speed f/kmax, generating a third list L3, that includes pairs common to the first list L1 and the second list L2, for each list L1 to L3, selecting a tension Tj associated with the streamer, and calculating a model-based velocity $vp(f, Tj)$ for the tension Tj, calculating a root mean square error (RMSE) between (a) the model-based velocity $vp(f, Tj)$ for the tension Tj, and (b) the first speed fmax/k or the second speed f/kmax, for each temporal frequency f, selecting the tension $T_{opt}$ associated with the minimum RMSE, and calculating the velocity $vp(f, T_{opt})$ based on the tension $T_{opt}$. In one application, the step of calculating the model-based velocity $vp(f, T)$ includes using a relationship between the model-based velocity and the tension in the streamer.

As will be appreciated by one skilled in the art, the above discussed embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such a floppy disk or magnetic tape. Other non-limiting examples of computer-readable media include flash-type memories or other known types of memories.

The disclosed embodiments provide a method for estimating a velocity of a transversal wave that propagates along a cable towed underwater and thus, to eliminate the influence of this wave when seismic data is acquired and processed. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for estimating the tension $T_{opt}$ of a tensed cable comprising plural sensors distributed along, the method comprising:
   estimating a first tension of the cable;
   measuring in the time-space domain with the plural sensors a parameter that is associated with vibrations that propagate along the cable, wherein the parameter may be an acceleration, velocity, displacement, or pressure;
   transforming the data Dt associated with the parameter from the time-space domain to the FK domain to obtain FK data F(f, k), wherein f is the temporal frequency and k is the spatial frequency;
   periodizing the data F(f, k) according to the spatial frequency k, wherein a factor C is used to replicate the data F(f, k) C times to obtain periodized data Fp(f, k);
   defining a mask M(f, k) in the FK domain to isolate an upward or downward wave and applying the mask M(f, k) to the periodized data Fp(f, k) to obtain masked data Wm(f, k);
   generating a first list L1, for each of the spatial frequency k, that includes (1) a frequency fmax that maximizes the masked data |Wm(f, k)|, and (2) a first speed fmax/k;
   generating a second list L2, for each the temporal frequency f, that includes (i) a spatial frequency kmax that maximizes the masked data |Wm(f, k)|, and (2) a second speed f/kmax;
   optionally generating a third list L3, that includes pairs common to the first list L1 and the second list L2
   for each of the generated lists, calculating a phase velocity vp(f) of the spatially aliased wave that propagates along the cable;
   selecting a tension Tj, and calculating a model-based velocity vp(f, Tj) for the tension Tj;
   calculating a root mean square error (RMSE) between (a) the model-based velocity vp(f, Tj) for the tension Tj, and (b) the velocity associated with each of the lists; and
   selecting the optimized tension $T_{opt}$ associated with the minimum RMSE.

2. The method of claim 1 further comprising:
   calculating the velocity vp(f, $T_{opt}$) of the spatially aliased wave using a model-guided regression, which is based on the phase velocity vp(f) and the model-based velocity vp(f, T) and the selected optimized tension; wherein the velocity vp(f, $T_{opt}$) is a function of the temporal frequency f.

3. The method of claim 1, further comprising:
   tensioning the cable, wherein plural sensors are distributed along the cable; measuring with the plural sensors a parameter that is associated with vibrations that propagate along the cable;
   calculating a phase velocity vp(f) of the spatially aliased wave that propagates along the cable, as a function of the temporal frequency f in a spatial-temporal frequency domain FK;
   calculating a model-based velocity vp(f, T) of the spatially aliased wave as a function of the temporal frequency f and a tension T in the cable; and
   calculating the velocity vp(f, $T_{opt}$) of the spatially aliased wave using a model-guided regression, which is based on the optimized tension $T_{opt}$, the phase velocity vp(f) and the model-based velocity vp(f, T),
   wherein the velocity vp(f, $T_{opt}$) is a function of the temporal frequency f.

4. The method of claim 3, wherein the step of calculating the phase velocity vp(f) comprises:
   receiving data Dt associated with the parameter measured with the plural sensors, wherein the parameter may be an acceleration, velocity, displacement, or pressure, and the parameter is measured in the time-space domain; and
   transforming the data Dt from the time-space domain to the FK domain to obtain FK data F(f, k), wherein f is the temporal frequency and k is the spatial frequency.

5. The method of claim 4, further comprising:
   periodizing the data F(f, k) according to the spatial frequency k, wherein a factor C is used to replicate the data F(f, k) C times to obtain the periodized data Fp(f, k);
   estimating a local tension in the cable;
   defining a mask M(f, k) in the FK domain to isolate an upward or downward wave; and
   applying the mask M(f, k) to the periodized data Fp(f, k) to obtain the masked data Wm(f, k).

6. The method of claim 5, further comprising:
   defining a minimum tension Tmin and a maximum tension Tmax that bounds an estimation of the local tension on the cable, and for each temporal frequency f, and for each spatial frequency k, calculating a minimum velocity vmin and a maximum velocity vmax associated with the Tmin and Tmax, respectively.

7. The method of claim 6, further comprising:
   for each velocity f/k that is larger than vmin and smaller than vmax, making an element f, k of the mask M(f, k) to be one.

8. The method of claim 5, further comprising:
   generating a first list L1, for each of the spatial frequency k, that includes (1) a frequency fmax that maximizes the masked data |Wm(f, k)|, and (2) a first speed fmax/k;
   generating a second list L2, for each the temporal frequency f, that includes (i) a spatial frequency kmax that maximizes the masked data |Wm(f, k)|, and (2) a second speed f/kmax; and
   generating a third list L3, that includes pairs common to the first list L1 and the second list L2.

9. The method of claim 8, further comprising:
   for each of the generated lists, selecting a tension Tj, and calculating a model-based velocity vp(f, Tj) for the tension Tj; and
   calculating a root mean square error (RMSE) between (a) the model-based velocity vp(f, Tj) for the tension Tj, and (b) the velocity associated with each of the lists.

10. The method of claim 9, further comprising:
    selecting the tension $T_{opt}$ associated with the minimum RMSE; and
    calculating the velocity vp(f, $T_{opt}$) based on the tension $T_{opt}$.

11. The method of claim 3, wherein:
    the cable is a streamer; and
    tensioning the cable is achieved by towing the streamer in water.

12. The method of claim 11, wherein the step of calculating the model-based velocity vp(f, T) comprises:
    using a relationship between the model-based velocity and the tension in the streamer.

13. A computing device for calculating a velocity vp(f, $T_{opt}$) of a spatially aliased wave that propagates along plural sensors, the computing device comprising:
    an interface configured to receive data Dt, wherein the data Dt is associated with a parameter measured by the plural sensors distributed along a cable, and the parameter is indicative of vibrations that propagate along the cable; and a processor connected to the interface, and configured to, calculate a phase velocity vp(f) of the spatially aliased wave that propagates along the cable, as a function of a temporal frequency f in a spatial-temporal frequency domain FK;

calculate a model-based velocity vp(f, T) of the spatially aliased wave as a function of the temporal frequency f and a tension T in the cable; and calculate the velocity vp(f, $T_{opt}$) of the spatially aliased wave using a model-guided regression, which is based on an optimized tension $T_{opt}$, the phase velocity vp(f) and the model-based velocity vp(f, T), wherein the velocity vp(f, $T_{opt}$) is a function of the temporal frequency f, and wherein the optimized tension $T_{opt}$ is calculated by:

estimating a first tension of the cable;

measuring, in the time-space domain with the plural sensors, the parameter that is associated with the vibrations that propagate along the cable, wherein the parameter may be an acceleration, velocity, displacement, or pressure;

transforming the data Dt associated with the parameter from the time-space domain to the FK domain to obtain FK data F(f, k), wherein f is the temporal frequency and k is the spatial frequency;

periodizing the data F(f, k) according to the spatial frequency k, wherein a factor C is used to replicate the data F(f, k) C times to obtain periodized data Fp(f, k);

defining a mask M(f, k) in the FK domain to isolate an upward or downward wave and applying the mask M(f, k) to the periodized data Fp(f, k) to obtain masked data Wm(f, k);

generating a first list L1, for each of the spatial frequency k, that includes (1) a frequency fmax that maximizes the masked data |Wm(f, k)|, and (2) a first speed fmax/k;

generating a second list L2, for each the temporal frequency f, that includes (i) a spatial frequency kmax that maximizes the masked data |Wm(f, k)|, and (2) a second speed f/kmax;

optionally generating a third list L3, that includes pairs common to the first list L1 and the second list L2 for each of the generated lists, calculating the phase velocity vp(f) of the spatially aliased wave that propagates along the cable;

selecting a tension Tj, and calculating the model-based velocity vp(f, Tj) for the tension Tj;

calculating a root mean square error (RMSE) between (a) the model-based velocity vp(f, Tj) for the tension Tj, and (b) the velocity associated with each of the lists; and selecting the optimized tension $T_{opt}$ associated with the minimum RMSE.

14. The computing device of claim 13, wherein the processor is further configured to:

receive the data Dt associated with the parameter measured with the plural sensors, wherein the parameter may be an acceleration, velocity, displacement, or pressure, and the parameter is measured in the time-space domain;

transform the data Dt from the time-space domain to the FK domain to obtain FK data F(f, k), wherein f is the temporal frequency and k is the spatial frequency;

periodize the data F(f, k) according to the spatial frequency k, wherein a factor C is used to replicate the data F(f, k) C times to obtain the periodized data Fp(f, k);

define a mask M(f, k) in the FK domain to isolate an upward or downward wave; and apply the mask M(f, k) to the periodized data Fp(f, k) to obtained the masked data Wm(f, k).

15. The computing device of claim 14, wherein the processor is further configured to:

estimate a local tension on the cable;

define a minimum tension Tmin and a maximum tension Tmax that bounds the estimation of the local tension on the cable; and for each temporal frequency f, and for each spatial frequency k, calculate a minimum velocity vmin and a maximum velocity vmax associated with the Tmin and Tmax, respectively.

16. The computing device of claim 15, wherein the processor is further configured to:

for each velocity f/k that is larger than vmin and smaller than vmax, make an element f, k of the mask M(f, k) to be one.

17. The computing device of claim 14, wherein the processor is further configured to:

generate a first list L1, for each of the spatial frequency k, that includes (1) a frequency fmax that maximizes the masked data |Wm(f, k)|, and (2) a first speed fmax/k; and generate a second list L2, for each the temporal frequency f, that includes (i) a spatial frequency kmax that maximizes the masked data |Wm(f, k)|, and (2) a second speed f/km ax.

18. The computing device of claim 17, wherein the processor is further configured to:

for each list, select a tension Tj associated with the cable, and calculate a model-based velocity vp(f, Tj) for the tension Tj; and calculate a root mean square error (RMSE) between (a) the model-based velocity vp(f, Tj) for the tension Tj, and (b) the velocity associated with each of the lists.

19. The computing device of claim 18, wherein the processor is further configured to:

select the tension $T_{opt}$ associated with the minimum RMSE; and calculate the velocity vp(f, $T_{opt}$) based on the tension $T_{opt}$.

20. The computing device of claim 13, wherein the processor is further configured to:

use a relationship between the model-based velocity and the tension in the cable to calculate the model-based velocity vp(f, T).

* * * * *